US011098682B2

(12) United States Patent
Zhao

(10) Patent No.: US 11,098,682 B2
(45) Date of Patent: Aug. 24, 2021

(54) ENGINE AND INTAKE SYSTEM THEREOF

(71) Applicant: SHANGHAI QINGCHE AUTOMOTIVE ENGINEERING CO., LTD, Shanghai (CN)

(72) Inventor: Yun Zhao, Shanghai (CN)

(73) Assignee: SHANGHAI QINGCHE AUTOMOTIVE ENGINEERING CO., LTD, Shanghai (CN)

( * ) Notice: Subject to any disclaimer, the term of this patent is extended or adjusted under 35 U.S.C. 154(b) by 991 days.

(21) Appl. No.: 15/541,270

(22) PCT Filed: Dec. 22, 2015

(86) PCT No.: PCT/CN2015/098280
§ 371 (c)(1),
(2) Date: Jun. 30, 2017

(87) PCT Pub. No.: WO2016/107469
PCT Pub. Date: Jul. 7, 2016

(65) Prior Publication Data
US 2017/0356403 A1 Dec. 14, 2017

(30) Foreign Application Priority Data

Dec. 31, 2014 (CN) .......................... 201410856041.0
Dec. 14, 2015 (CN) .......................... 201510934884.2

(51) Int. Cl.
*F02M 35/10* (2006.01)
*F02B 33/34* (2006.01)
(Continued)

(52) U.S. Cl.
CPC ....... *F02M 35/10091* (2013.01); *F02B 33/34* (2013.01); *F02B 37/04* (2013.01);
(Continued)

(58) Field of Classification Search
CPC .......... F02B 33/34; F02B 39/10; F02B 37/04; F02B 37/16; F02M 35/10157;
(Continued)

(56) References Cited

U.S. PATENT DOCUMENTS 4,693,085 A 9/1987 Sumser
6,269,806 B1 * 8/2001 Dellarosa ................ F02B 27/04
123/590

(Continued)

FOREIGN PATENT DOCUMENTS

CN 101666260 3/2010
CN 201546801 8/2010
(Continued)

OTHER PUBLICATIONS

Search Report of CN2015109348842, dated Mar. 25, 2018.
(Continued)

*Primary Examiner* — Ngoc T Nguyen
(74) *Attorney, Agent, or Firm* — Hamre, Schumann, Mueller & Larson, P.C.

(57) ABSTRACT

An intake system of engine comprises an intake pipe (8), an air intake manifold (6), and an auxiliary intake assembly (4) disposed on the intake pipe (8) and located before the air intake manifold (6) of an engine. The auxiliary intake assembly (4) comprises an auxiliary air inlet passage, an auxiliary air outlet passage (21), and a central passage (39). Air enters through the auxiliary air inlet passage, comes out from the auxiliary air outlet passage (21) and enters the central passage (39), so as to be mixed with air from the intake pipe (8). The present invention further relates to an engine intake system, comprising an electronic booster (4") located upstream of the air intake manifold (6) of an engine. An air flow enters from an air inlet (4241"), flows out from an air outlet (4242"), is mixed with air that flows through the
(Continued)

intake pipe (8), and then is inhaled into a cylinder of the engine. The present invention further relates to a engines comprising the above intake systems. These intake systems and engines can effectively reduce discharge, reduce fuel consumption, improve engine efficiency, improve a low-speed torque feature of the engines, and improve a low temperature cold start effect of the engines.

8 Claims, 20 Drawing Sheets

(51) Int. Cl.
  *F02B 37/04* (2006.01)
  *F02B 39/10* (2006.01)
  *F02M 25/022* (2006.01)
  *F02M 25/028* (2006.01)
  *F02M 31/04* (2006.01)
  *F02M 35/024* (2006.01)

(52) U.S. Cl.
  CPC ........... *F02B 39/10* (2013.01); *F02M 25/028* (2013.01); *F02M 25/0222* (2013.01); *F02M 31/042* (2013.01); *F02M 35/024* (2013.01); *F02M 35/10* (2013.01); *F02M 35/10157* (2013.01); *F02M 35/10268* (2013.01); *Y02T 10/12* (2013.01)

(58) Field of Classification Search
  CPC ........... F02M 35/10091; F02M 35/024; F02M 35/10262; F02M 35/10039; F02M 31/042; F02M 25/028; F02M 25/0222
  See application file for complete search history.

(56) References Cited

U.S. PATENT DOCUMENTS

| | | | |
|---|---|---|---|
| 2003/0140909 A1 | 7/2003 | Criddle et al. | |
| 2006/0278192 A1* | 12/2006 | Now | F02M 27/04 123/184.53 |
| 2008/0283014 A1* | 11/2008 | Konzelmann | G01F 15/00 123/184.21 |
| 2009/0248271 A1* | 10/2009 | Kuzuyama | F02D 41/005 701/103 |
| 2011/0308494 A1* | 12/2011 | Lukasavitz | F02M 35/10386 123/198 E |
| 2014/0069095 A1* | 3/2014 | Nixon | F02B 31/00 60/605.1 |
| 2014/0158079 A1* | 6/2014 | Keffer | B01F 5/0413 123/184.53 |
| 2018/0328379 A1* | 11/2018 | Harris | F01D 5/066 |

FOREIGN PATENT DOCUMENTS

| | | | |
|---|---|---|---|
| CN | 102182589 A | 9/2011 | |
| CN | 202140201 U | 2/2012 | |
| CN | 203098040 U | 7/2013 | |
| CN | 203308575 | 11/2013 | |
| CN | 203308622 | 11/2013 | |
| CN | 105804896 A | 7/2016 | |
| JP | S55139929 | 11/1980 | |
| KR | 20090042577 | 4/2009 | |
| WO | WO-2012030776 A2 * | 3/2012 | ............ F02M 26/19 |
| WO | WO-2014030248 A1 * | 2/2014 | ............ F04D 29/441 |

OTHER PUBLICATIONS

Search Report of CN2014108560410, dated Mar. 26, 2018.
International Search Report (Chinese and English) and Written Opinion of International Application No. PCT/CN2015/098280, dated Mar. 31, 2016, total 13 pages.

* cited by examiner

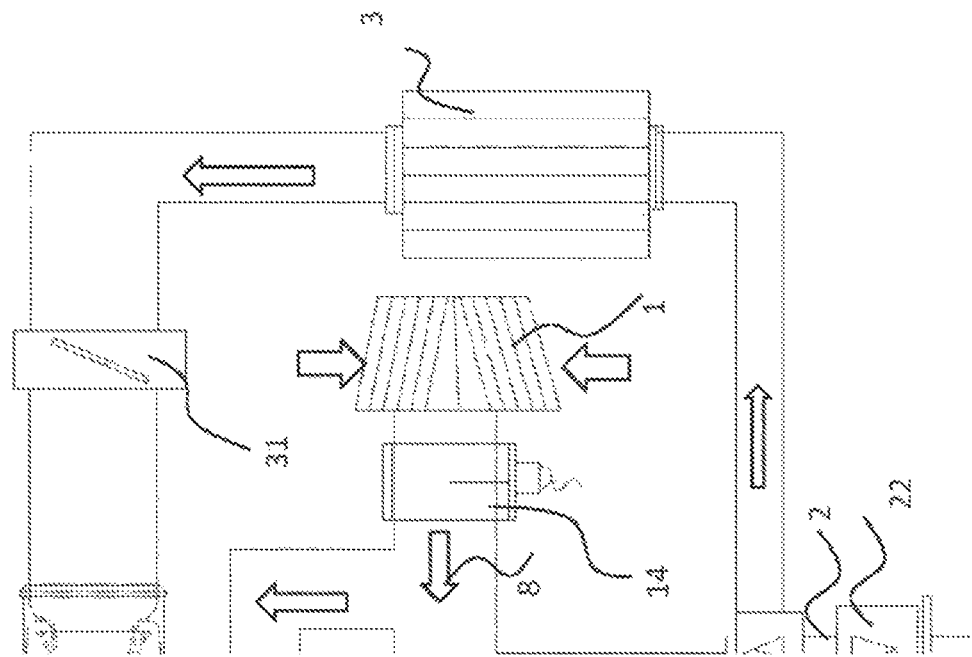
Fig. 18
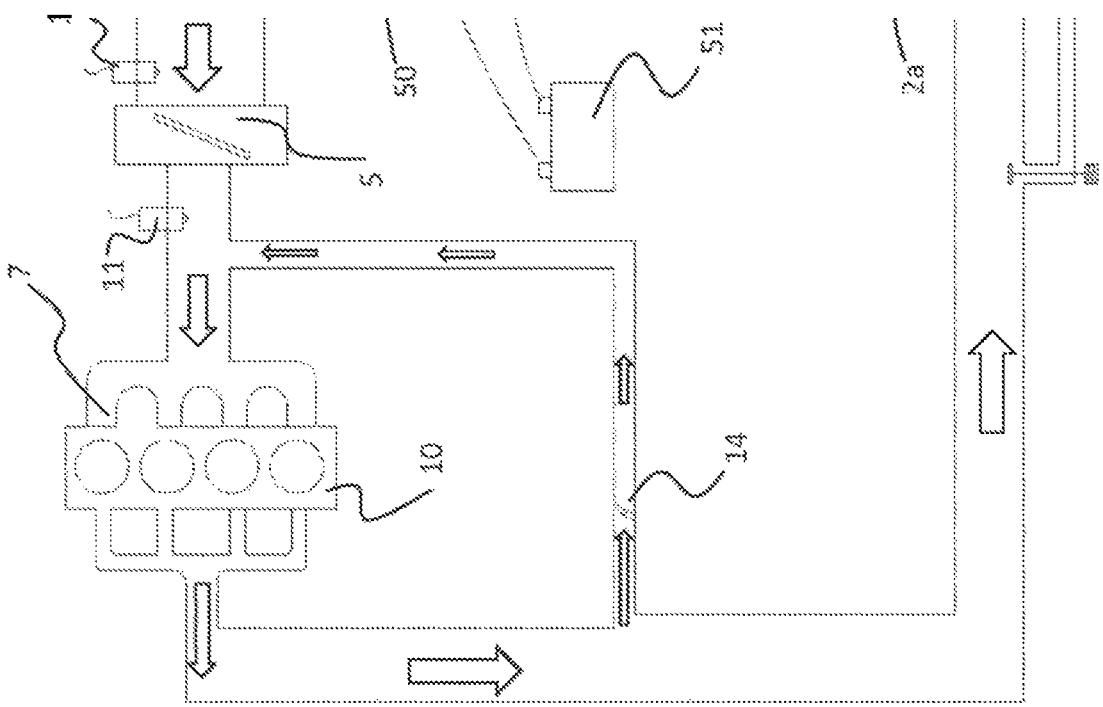

ENGINE AND INTAKE SYSTEM THEREOF

CROSS-REFERENCE TO RELATED APPLICATIONS

This application claims the benefit of Chinese Application No. 2014108560410 filed on Dec. 31, 2014, entitled "Engine and intake system thereof" and Chinese Patent Application No. 2015109348842 filed on Dec. 14, 2015, entitled "Engine And intake system thereof", the entire contents of which are incorporated herein by reference.

FIELD OF THE INVENTION

The present invention relates to an internal combustion engine, and more particularly to the control of an internal combustion engine based on a mixture of fuel and gas, including gasoline engine control, diesel engine control, natural gas and other fuel (such as methanol, ethanol, mixture of dimethyl ether and gasoline) engine control, as well as the control and application of the vehicle provided with the engine mentioned above.

BACKGROUND OF THE INVENTION

The supercharging technology of the internal combustion engine is mainly used for increasing the pressure of air inhaled into the internal combustion engine, improving the amount of the intaken air in a single combustion cycle, and therefore improving the power and the torque of the engine. The air comprises fresh air and combustible gas mixed with the fuel. At present, main boost modes have turbo boost, supercharge and electric turbo boost, and a hybrid supercharging system (dual turbo boost, turbo boost combined with supercharge or electric boost).

The turbocharger is mainly used for increasing the intake pressure of an engine and increasing the amount of intake air the engine through compressed air. The main principle is as follows: a turbine in a turbine chamber is pushed by utilizing an exhaust gas inertia impact force discharged by an engine, and the turbine drives the coaxial impeller, the impeller is used for pressurizing and sending air conveyed by the air filter pipe, so that the air is pressurized to enter the cylinder. FIG. 1 is a typical diagram of the intake system of engine with a turbocharger. The air 1 enters the air inlet pipe 8 through the air filter 2 through the environment air inlet, and is pressurized through the turbocharger 2, is cooled by the intercooler 3 and then enters the engine manifold main pipe 6 through the electronic throttle 5, and then enters the engine cylinder 10 through an engine manifold. The defect of the turbocharger is that a "turbine response hysteresis" phenomenon is generated since an impeller cannot be driven to generate under the condition that the inertia impact force of the waste gas is insufficient in the low-speed state of an engine.

The supercharger (also referred to as a super-charger) is installed on an engine and is connected with an engine crankshaft through a belt, and power is obtained from the output shaft of the engine to drive the rotor of the supercharger to rotate, so that air is pressurized and blown into the air inlet pipe. The advantage thereof is that the hysteresis response of the turbocharger is avoided, and the power output is smoother, but the defect is that part of engine power is consumed, so that the boost efficiency is not high, and the oil consumption is high. The electric boost is driven by a motor instead of the exhaust gas to drive blades to rotate so as to realize air compression. The electric turbine is fast in response, and the pressure output does not depend on the rotating speed of the engine, so that the method got more and more attention in the field of engine control. With the development of the motor technology, the electric turbine with high-reliability has been widely applied. Due to the rotating speed-torque characteristic of the motor, and the electric boost is difficult to meet the requirement of the amount of intake air of the engine under the high-rotating-speed and large-load working condition of the engine. So, it is commonly added to other boost systems an auxiliary supercharging system. And, the composite pressurizing system is a combination of the above supercharged systems, and aims to improve the supercharging effect and achieve the progressive application of the boost comprehensive performance under the low-speed and high-speed operation of an engine. For example, dual turbo boost is a turbo lag phenomenon for exhaust gas turbine boost, a low-speed turbine is additionally arranged, and when the engine is in a low rotating speed, so that the turbine can be driven to rotate at a high speed by less exhaust gas so as to generate enough air inlet pressure, when the rotating speed of the engine is increased, the high-speed turbine works continuously to enter a high-pressure-value state, and a continuous strong power is provided. The turbo-boost and supercharge combined boost system is used for simultaneously solving the problem of low-speed torque output of a turbocharger and the problem of high-speed power output of the mechanical boost. The composite boost system has the advantages of being high in engine output power and low in fuel consumption rate, and is suitable for all working conditions of an engine. The defect of the structure is that the structure is too complex and the cost is too high.

In recent years, a novel composite boost system is provided, the system uses turbocharger and electric boost to optimize the boost control of the full-operation working condition of the engine. The traditional turbocharger has the advantages that only when the engine runs to a higher rotating speed, when the emission amount of the exhaust gas reaches a certain degree, the strongest supercharging effect can be achieved, and the strongest power is generated. The electric supercharger eliminates the dependence on engine waste gas. The electric supercharger can work under the low-rotating-speed working condition of the engine through the electric power provided by the battery, and generate high boost instantly so that the engine can release high-torque. the exhaust gas turbine gradually takes over the boost function along with the increase of the rotating speed of the engine to reach the maximum torque. The efficiency of the combination of exhaust gas turbine boost and electric boost is similar to that of the combination of exhaust gas turbine boost and mechanical boost, and when the exhaust gas turbine is insufficient in boost, is used for achieving rapid boost through mechanical or electric power. Differently, the electric boost is faster than mechanical boost. The electric power of electric boost can be from the recovered and stored electric energy in the vehicle deceleration and braking. The mechanical boost is carried out by the aid of the engine, and therefore the combined boosting system with the waste gas turbine boosting and electric boosting is more energy-saving compared with a combined boosting system of the waste gas turbine boosting and mechanical boosting.

Although the several above composite supercharging systems have the operation effect under the full-working condition of the engine, the number of parts of the supercharging system is increased, rendering that the engine air inlet and exhaust system is very complex, and the boost switching control of the multi-stage supercharging system is complex.

the requirement of the control algorithm and the matching calibration of the engine control system are very strict. For example, the electric boost and turbocharger combined boost system of the audi is used for achieving electric boost and turbocharger collaborative work, and the electric boosting air inlet pipe is connected with the turbo supercharged air inlet pipe in parallel, and a bypass valve is arranged for switching the air inlet pipe to be communicated with the electric supercharger or bypass the electric supercharger.

SUMMARY OF THE INVENTION

The invention mainly designs an auxiliary intake assembly which is unique in structure and capable of greatly simplifying the structure of the composite pressurizing system and an engine intake system using the auxiliary intake assembly. The air flow of the engine can be effectively increased by using the auxiliary intake assembly, and the working efficiency of the engine is improved. The maximum torque of the engine is improved, and the pipe structure of the composite pressurizing system is greatly simplified. The auxiliary intake assembly is arranged on the intake pipe and is located in front of an air intake manifold main pipe of the engine. The auxiliary intake assembly includes at least one gas inlet, at least one gas outlet and an internal passage, wherein the internal passage is used for transporting gas from at least one gas inlet to the at least one gas outlet. The air in the internal passage is accumulated to form a high-pressure air flow during the electric boost works, so that the internal passage is also referred to as a boost chamber.

When the auxiliary intake assembly works, air introduced into an inlet of the auxiliary intake system is pressurized by the auxiliary intake assembly and is guided to an air outlet of the auxiliary intake assembly through an airflow passage of the auxiliary intake assembly. According to the bernoulli principle and the mass conservation law, the sum of the static pressure and dynamic pressure of airflow at the air inlet of the auxiliary intake assembly is approximately equal to the sum of the static pressure and the dynamic pressure of the annular gap outlet of the auxiliary intake assembly. The mass of the air entering the auxiliary intake assembly is equal to the mass of the air discharged by the outlet of the auxiliary intake assembly, namely after the air enters the boost chamber of the auxiliary intake assembly, the flow velocity is lowed by changing the flow direction of air through the inner wall of the boost chamber, so that the static pressure of the air in the boost chamber is increased. Air is accelerated to be blown out due to pressure difference at the annular outlet of the boost chamber. The high-speed airflow is mixed with the airflow in the original intake pipe. According to bernoulli principle, The larger the flow rate is, the smaller the pressure is. Thus, a low pressure region is formed at the rear part of the annular gap, so that more air in the original intake pipe enters the pipe to compensate low-pressure area, and the mixed air flow is accelerated to flow to the engine cylinder, so that more air is inhaled into the cylinder.

The air source of the auxiliary intake assembly is mainly from an electric turbocharger. The electric turbocharger can be divided into two types according to the type of the air compressor, ie. an axial-flow type electric turbocharger and a centrifugal type electric turbocharger. The axial-flow type electric turbocharger is mainly composed of a motor and fan blades, wherein the motor and the fan blades are arranged on an air inlet pipe, and the motor drives the fan blades to rotate, so that the gas flows in parallel with the axial direction of the motor. The principle of the centrifugal type electric turbocharger is similar to that of a turbocharger, and the turbocharger is driven by a motor instead of exhaust gas, wherein the air compressor side is kept unchanged, the gas enters the impeller along the axial direction, and the gas flows out in the radial direction when flowing through the impeller.

Preferably, the axial flow type electric turbocharger or the centrifugal type electric turbocharger is selected according to the displacement of the engine and the air flow needed.

The axial-flow electric turbocharger is characterized in that: the supplied air is large in flow and small in static pressure; the air density is small; the requirement to the performance of the motor, such as speed and power, is not high; and is suitable for engines with relatively high requirements on the flow of air compensated by the auxiliary intake assembly and low requirement on the pressure of the supercharged pressure. The static pressure can be improved by a plurality of axial flow fans in a multi-stage serial connection mode.

The centrifugal type electric turbocharger is characterized in that: the amount of air supplied is less than that of axial flow type; the air static pressure is large; the density is large; the requirement to the performance of the motor, such as speed and power, is high; and suitable for engines with relatively high requirements on the supercharged pressure of air compensated by the auxiliary intake assembly and low requirement on the flow of the air.

Preferably, the motor of the centrifugal type electric turbocharger is a switched reluctance motor. Due to the fact that the motor needs to operate in a harsh environment around the peripheral working condition of the engine, the application advantages of the switched reluctance motor in the engine intake system are mainly expressed as follows: the motor is simple in structure, low in cost and capable of being used for high-speed operation; the power circuit is simple and reliable; the system is high in reliability and good in robustness; the starting torque is large, and the starting current is low; suitable for frequent starting and stopping requirements of an engine intake system; the efficiency is high, and the loss is low.

Preferably, the switched reluctance motor is composed of a super capacitor array and with the direct-current inverter boosting circuit so as to achieve rapid response of the motor and reduce delay of the response to electric boost. The super-capacitor array is charged through the vehicle-mounted battery to obtain electric energy used to drive the motor. The electric energy is released through the direct-current inverter boosting circuit and drives the motor to rotate.

Preferably, the super capacitor array is used in cooperation with a vehicle brake energy recycling system. The braking energy is converted into electric energy through the braking capacity recycling system to charge the super-capacitor array, and the purpose of reducing the fuel consumption is achieved;

Preferably, the super-capacitor array is a 36V –48 v and 100f super-capacitor array, and can drive the 1 KW motor to work for 1 minute to meet the energy capacity requirement of a low-speed frequent starting working condition;

Preferably, the compensated air can be preheated by a heating device before entering the intake pipe assembly.

Preferably, the heating device is a heating wire or a PTC ceramic material.

The heating device is powered by a vehicle-mounted battery.

The heating energy and the heating timing are determined according to the actual working condition of the engine, especially when the engine is in a low-temperature cold starting state, the heating air is inhaled into the cylinder, so that the cold starting emission of the engine can be effectively improved, and the starting time is shortened.

The air inlet of the auxiliary intake assembly can also be connected with an outlet of the air compressor. The air compressor is used for inhaling air and compressing the air into a high-pressure gas.

The air compressor is used for converting mechanical energy into air potential energy through suction and extrusion by a hydraulic pump or an electric pump.

Preferably, the braking energy can be supplied to the air compressor through the vehicle braking energy recycling system.

In one embodiment, the auxiliary intake assembly can be internally provided with a heating device, wherein the heating device is used for heating air inhaled into the auxiliary intake assembly.

The heating device can be installed in the base and located at front of the fan of the auxiliary intake assembly, or the heating device can be installed in the base and located at the air inlet.

Air inhaled by the air inlet passes through the heating device and then enters the airflow pipe through the fan blades.

According to one aspect of the invention, an intake system of engine is provided, wherein the intake system is provided with a intake pipe, wherein at least a part of the intake pipe of the intake system is provided with an auxiliary intake assembly, wherein the auxiliary intake assembly is provided with an auxiliary air inlet passage, an auxiliary air outlet passage and a central passage, wherein the auxiliary air inlet passage is communicated with an air source, so that air enters from the auxiliary air inlet passage and flows out of the auxiliary air outlet passage and then enters the central passage, wherein the auxiliary air outlet passage has a preset length and extents towards the flow direction of air in the intake pipe, and the central passage is in fluid communication with the intake pipe, so that air from the auxiliary intake assembly and air flowing from the intake pipe are inhaled into an cylinder of the engine after mixing.

In one embodiment, the engine intake system further comprises an intake manifold and the auxiliary intake assembly is arranged on a intake pipe between an air filter and the air intake manifold of the engine.

In one embodiment, the engine intake system is further provided with an intake manifold, a turbocharger and an intercooler, wherein the turbocharger is arranged on an intake pipe between an air filter of the engine and the intercooler, and the auxiliary intake assembly is arranged on an intake pipe between the intercooler and the air intake manifold main pipe.

In one embodiment, the intake system of engine is further provided with a turbocharger and an intercooler, wherein the turbocharger is arranged on an intake between an air filter and the intercooler of the engine, and the auxiliary intake assembly is arranged on an intake pipe between the air filter and the turbocharger.

In one embodiment, the air source connected to the air inlet passage of the auxiliary intake assembly can be provided by an electric supercharger, wherein the impeller is driven to rotate through a motor.

In one embodiment, the airflow from the electric supercharger passing through blades is of axial flow type or a centrifugal mode.

In one embodiment, the gas source connected to the air inlet passage of the auxiliary intake assembly can be from a gas released from the high-pressure air storage tank.

In one embodiment, the high-pressure air storage tank can be inflated by a hydraulic pump or an electric pump.

In one embodiment, an electric supercharger or a high-pressure air storage tank of the auxiliary intake assembly is driven by a vehicle-mounted battery, wherein a part of power of the vehicle-mounted battery is from a vehicle brake energy recycling system and is used for reversely charging a battery.

In one embodiment, the preset length of the auxiliary air outlet passage is 1-55 millimeters. Preferably, the preset length is 5-40 mm.

In one embodiment, an annular flow guiding plate can be arranged at an inlet of the auxiliary air outlet passage and is used for guiding airflow to flow towards an outlet of the auxiliary air outlet passage.

In one embodiment, the surface of the annular flow guiding plate is designed to has a surface with a shape guiding airflow to form a Coanda Effect.

In one embodiment, the auxiliary air outlet passage is gradually narrowed in the air flow direction.

In one embodiment, the auxiliary air outlet passage is narrowed relative to the auxiliary air inlet passage.

In one embodiment, the auxiliary intake assembly is further provided with an air chamber (or is referred as an internal passage) is arranged between the auxiliary air inlet passage and the auxiliary air outlet passage and is communicated with the auxiliary air inlet passage and the auxiliary air outlet passage, wherein the auxiliary air outlet passage is narrowed relative to the air chamber.

In one embodiment, the auxiliary air outlet passage is an annular passage. Preferably, the size of the annular passages is 0.3-5 millimeters. Preferably, the cross section of the annular passage is in an annular shape or an oval shape.

In one embodiment, the air chamber is an annular passage.

In one embodiment, the auxiliary intake assembly can be integrally formed in the intake pipe, or the auxiliary intake assembly is a separate independent component and is connected to the intake pipe in series.

In one embodiment, the auxiliary intake assembly is further provided with a fluid adding device, liquid (such as liquid water or water and methanol or ethanol mixed liquid)) is atomized by the fluid adding device and then is mixed with air in the intake pipe and then inhaled into an cylinder of the engine.

In one embodiment, the fluid adding device is sprayed into a pipe of the auxiliary intake assembly through a nozzle through a siphon principle.

In one embodiment, the auxiliary intake assembly is further provided with an air chamber. Airflow flows through the auxiliary air inlet passage and flows through the air chamber and then flows out of the auxiliary air outlet passage.

In one embodiment, the shape of the air chamber is provided so as to guide airflow from the auxiliary air inlet passage towards the auxiliary air outlet passage.

In one embodiment, the auxiliary intake assembly comprises an inner tube and an outer tube, wherein the inner tube and the outer tube jointly define the central passage, and one end of the inner tube is hermetically connected to one end of the outer tube, the other end of the inner tube extends into the outer tube, such that an air chamber is formed between the inner tube and the outer tube, wherein the air chamber is communicated with the auxiliary air outlet passage, and airflow enters through the auxiliary air inlet passage and flows through the air chamber, and then flows out of the auxiliary air outlet passage and enters the central passage.

In one embodiment, the inner tube is provided with an inner annular flow guiding portion and an inner annular connecting portion, and the outer tube is provided with a tubular body, an outer annular flow guiding portion and an outer annular connecting portion, wherein the outer annular flow guiding portion is provided inside of the tubular body and extends from the outer annular connecting portion towards the inner annular connecting portion, wherein the inner annular flow guiding portion extends from the inner annular connecting portion towards the outer annular connecting portion, and at least a part of the inner annular flow guiding portion surrounds at least a part of the outer annular flow guiding portion to form the auxiliary air outlet passage.

In one embodiment, the air chamber is formed between the inner annular flow guiding portion and the tubular body, and the inner annular flow guiding portion is provided with a first segment and a second segment which extend from the inner annular connecting portion, wherein the second segment of the inner annular flow guiding portion surrounds at least a part of the outer annular flow guiding portion to form the auxiliary air outlet passage.

In one embodiment, one end of the inner annular connecting portion is connected to the tubular body of the outer tube, and the other end of the inner annular connecting portion is used for being connected to the intake pipe.

In one embodiment, the inner side face of the inner tube and the inner side surface of the outer annular flow guiding portion of the outer tube forms the central passage, and the central passage is a part of the main air inlet passage of the intake pipe, or the central passage is communicated with a main air inlet passage of the intake pipe.

In one embodiment, the outer annular flow guiding portion is gradually narrowed in the flow direction of the airflow in the intake pipe, and then the inner diameter thereof become smallest at the outlet of the outlet passage; and the inner annular flow guiding portion is trumpet-shaped and gradually narrowed in the direction opposite to the direction of the air flow in the intake pipe, and is gradually widened from the outlet of the outlet passage and is in a trumpet-shaped radiation shape.

In one embodiment, the outer diameter of the inner annular flow guiding portion is smaller than the inner diameter of the tubular body of the outer pipe.

In one embodiment, the outer diameter of the outer annular flow guiding portion is smaller than the inner diameter of the inner annular flow guiding portion a tube. The inner diameter of the inner annular flow guiding portion is larger than the inner diameter of the inner annular flow guiding portion.

In one embodiment, the shape of the second segment is trumpet-shaped.

In one embodiment, the surface of the outer annular flow guiding portion is arc-shaped.

In one embodiment, the length of the outer annular flow guiding portion is smaller than the length of the inner annular flow guiding portion.

In one embodiment, the length of the outer annular flow guiding portion is smaller than or equal to the length of the second segment of the inner annular flow guiding portion.

In one embodiment, one end of the outer annular flow guiding portion is connected to the outer annular connecting portion, and the other end is a free end.

In one embodiment, one end of the inner annular flow guiding portion is connected to the inner annular connecting portion, and the other end is a free end.

In one embodiment, the auxiliary intake assembly further provided with at least one nozzle, and the nozzle is detachably mounted on the auxiliary intake assembly, wherein an outlet of the nozzle is communicated with the central passage, and an inlet of the nozzle is communicated with a liquid source, so that liquid is sprayed into the central passage from the nozzle and then enters the intake pipe.

In one embodiment, the nozzle utilizes the air flow inside the auxiliary intake assembly and the auxiliary air inlet a component and the pressure difference generated by the air flow in the main pipe upstream of the central passage inhales liquid into the intake pipe and atomizes the liquid. The nozzle inhale liquid into intake pipe through the pressure difference generated by the internal air flow of the auxiliary intake assembly and the intake pipe upstream of the central passage of the auxiliary intake assembly and then the liquid is atomized.

In one embodiment, the liquid is pure water, wherein the nozzle is used for humidifying air in the intake pipe.

In one embodiment, the liquid is a mixture of water and methanol or ethanol. The methanol or ethanol has the effects of combustion improver and inhibiting icing at low temperature.

In one embodiment, the pressure difference ranges from 10 KPa to 100 KPa.

In one embodiment, the outlet of the nozzle is located at the side of the auxiliary air outlet passage close to the cylinder, and a preset distance is formed between the outlet of the nozzle and the auxiliary air outlet passage. Preferably, the predetermined distance is set such that airflow flowing out of the auxiliary air outlet passage can directly act on the liquid flowing out from the outlet of the nozzle to atomize the liquid. Preferably, the preset distance is 2-50 mm. Preferably, the preset distance is 5-15 mm.

In one embodiment, the fluid source is a fluid source with pressure.

In one embodiment, a pressure pump is arranged on a pipe between an inlet of the nozzle and a fluid source.

In one embodiment, a flow control valve is arranged on a pipe between an inlet of the nozzle and a fluid source, such as an electromagnetic valve.

In one embodiment, a plurality of nozzles are mounted along the circumferential direction of the auxiliary intake assembly.

In one embodiment, the auxiliary intake assembly is further provided with a vent pipe. One end of the ventilation pipe is communicated with a intake pipe or a central passage upstream of the auxiliary intake assembly, and the other end of the vent pipe is communicated with a pipe between the nozzle and the liquid source or is communicated with the liquid source liquid storage tank, wherein the interior of the liquid storage tank is isolated from the external atmospheric pressure.

In one embodiment, the liquid source needed by the nozzle can be rainwater guided and collected from the front windshield of the vehicle, or can be water discharged from the exhaust manifold of the vehicle, or can be condensed water accumulated outside the condenser of the air conditioning condenser, or can be water manually injected into the water tank.

In one embodiment, the nozzle is simultaneously used as a connector for an inner tube and an outer tube.

In one embodiment, the auxiliary intake assembly comprises an inner tube and an outer tube, one end of the inner pipe is hermetically connected to one end of the outer pipe, and the other end of the inner tube extends into the outer tube, so that an air chamber is formed between the inner tube and the outer tube, wherein airflow enters the air chamber through the auxiliary air inlet passage, and flows out from the auxiliary air outlet passage, wherein the nozzle is located on the air outlet side of the auxiliary air outlet passage and passes through the outer tube, the air chamber and the inner tube and then is communicated with the intake pipe.

In one embodiment, the nozzle is internally provided with a flow passage for liquid to be transmitted from an inlet of the nozzle to an outlet of the nozzle, and at least one air inlet hole is formed in the side wall of the nozzle defining the flow passage, and the air inlet hole is in fluid communication with the air chamber.

In one embodiment, the diameter of the air inlet hole is 0.3-1 mm. Preferably, the diameter is 0.75 mm.

In one embodiment, the auxiliary intake assembly is used in cooperation with an upstream second throttle. The second throttle is used for preventing the pressurized gas from flowing back to an outlet of the upstream turbine supercharged air compressor when the electric booster works, so that the boost pressure in the pipe can be quickly established through electric boost.

According to the further aspect of the invention, the intake system of engine is provided, wherein the intake system comprises an intake pipe, an intake manifold and an intake manifold main pipe, wherein the intake system further comprises an electric supercharger arranged on the intake pipe and located in upstream of the intake manifold main pipe of the engine, wherein the electric supercharger comprises a base, fan blades and a motor arranged in the base as well as a boost pipe in fluid communication with the base, wherein the base is provided with an air inlet, and the boost pipe is provided with an air outlet, wherein the boost pipe is connected in series with the intake pipe and is in fluid communication with the intake pipe, wherein the motor can drive the fan blades to rotate, so that airflow flows into through the air inlet and flows out from the air outlet, and is mixed with air flowing through the intake pipe and then is inhaled into an cylinder of the engine.

Preferably, the airflow is ambient air.

Preferably, the motor is powered by a vehicle-mounted battery.

Preferably, the motor is located on the air outlet side of the fan blade to drive the fan to rotate. The air flow stirred by the fan enters through the front of the fan blades and is discharged through the rear of the fan blades, the motor is located behind the fan blades, the airflow blown out by the fan blows through the motor and then enters the airflow pipe, so that the purpose of cooling the motor can be achieved. the motor is located on the air outlet side of the fan blade. The motor drives the fan to rotate, and air flow stirred by the fan enters through the front of the fan blade and is discharged from the rear of the fan blade. The airflow blown out by the fan blows through the motor and then enters the airflow pipe, and the purpose of cooling the motor can be achieved since the motor is located behind the fan blades.

In one embodiment, the two ends of the boost pipe are respectively connected with the air filter side and the cylinder side of the intake pipe of the engine in series.

In one embodiment, the center of the boost pipe is provided with a first air flow passage in fluid communication with the intake pipe, and a second airflow passage is formed between the inner pipe wall defining the first airflow passage and the outer pipe wall of the boost pipe, wherein an inlet of the second airflow passage is in fluid communication with the base, and an outlet of the second airflow passage is the air outlet of the boost pipe and is in fluid communication with the first airflow passage.

In one embodiment, the air outlet of the boost pipe is narrowed relative to the second airflow passage and forms a gap, wherein an inlet of the gap is in fluid communication with the base through the second airflow passage, and an outlet of the gap is oriented in the same direction as the flow direction of airflow in the intake pipe, wherein the space formed by the gap is in fluid communication with the intake pipe.

In one embodiment, the gap can be an annular gap.

Preferably, the cross section of the annular gap is in an annular shape or an oval shape. The gap can be formed by a plurality of sections of narrow passages which are spaced apart from each other.

Preferably, the gap further plays a role in guiding airflow to flow towards the cylinder.

Preferably, the length of the gap along the axial direction of the first airflow passage is 1-25 mm.

An annular guiding plate is arranged at the inlet of the gap and used for guiding airflow to flow towards the outlet of the annular gap.

Preferably, the shape of the surface of the annular flow guiding plate is designed to guide the airflow to form Coanda Effect.

The second airflow passage can be formed by a space between the outer wall of the boost pipe and the inner wall of the boost pipe.

Preferably, the motor is a switched reluctance motor. Due to the fact that the motor needs to operate in a harsh environment around the peripheral working condition of the engine, the application advantages of the switched reluctance motor in the engine intake system are mainly expressed as follows: the motor is simple in structure, low in cost and capable of being used for high-speed operation; the power circuit is simple and reliable; the system is high in reliability and good in robustness; the starting torque is large, and the starting current is low; suitable for frequent starting and stopping requirements of an engine intake system; the efficiency is high, and the loss is low.

When the electric supercharger works, the inhaled air is guided to the air outlet of the electric supercharger through the air flow passage of the electric supercharger after being supercharged by the electric supercharger. The annular notch of the air outlet enables the air to be squeezed at the outlet, so that air is blown out accelerated, and an combined air flow which has a same flow direction as the airflow direction in the original intake pipe is formed, and the air flow in the original intake pipe is driven to be accelerated to flow to the engine cylinder, so that boost can be realized.

When the electric supercharger stops working, due to the bernoulli effect, when the air in the intake pipe of the engine flows, a negative pressure area can be formed at the annular gap, so that air in the electric supercharger communicated with the outside air is inhaled into the intake pipe through the annular gap, and the amount of air entering the cylinder is increased.

The gap is formed by combining a section of annular inner wall of the second air flow passage and a section of annular wall extending internally from one end of the boost pipe connected with an air filter.

The gap may be a segment of small narrow space which connects the intake pipe of engine to the airflow passage of the electric supercharger, such that the air flow passage becomes a semi-closed system. The airflow in the second airflow passage can flow out of the airflow passage through the gap and enters the first airflow passage, and then enters the intake pipe and flows in the air flowing direction in the intake pipe. The annular gap simultaneously plays a role in accelerating the flowing-out air flow.

Preferably, the size of the gap is 0.3-5 mm, or the size of the gap is 1/40-1/3 of the inner diameter of the boost pipe. Preferably, the size of the gap ranges from 1 mm to 4 mm, or the size of the gap is 1/20-1/4 of the inner diameter of the boost pipe.

Preferably, the shape of the surface of the inner wall of the first air flow passage located at the outlet of the gap is designed to guide air flow to form Coanda Effect.

In one embodiment, the electric supercharger can be internally provided with a heating device, wherein the heating device is used for heating air inhaled into the electric supercharger.

Preferably, the heating device is a heating wire or a PTC ceramic material.

The heating device is powered by a vehicle-mounted battery.

The heating energy and the heating timing are determined according to the actual working condition of the engine, especially when the engine is in a low-temperature cold starting state, the heating air is inhaled into the cylinder, so that the cold starting emission of the engine can be effectively improved, and the starting time is shortened.

The heating device is installed in the base and is located at front of the fan of the electric supercharger, or the heating device is arranged in the base and is located at the air inlet.

Air inhaled by the base passes through the heating device and then enters the airflow pipe through the fan blades.

In one embodiment, the intake system of engine is further provided with a turbocharger and an intercooler, wherein the turbocharger is arranged on an intake pipe between an air filter and the intercooler of the engine, and the electric supercharger is arranged on an intake pipe between the air filter and the turbocharger.

In another embodiment, the intake system of engine is further provided with a turbocharger and an intercooler, wherein the turbocharger is arranged on an intake pipe between an air filter and the intercooler of the engine, and the electric supercharger is arranged on an intake pipe between the intercooler and the intake manifold main pipe.

According to another aspect of the invention, the invention further provides an engine. The engine adopts the engine intake system as described above In the intake system of engine according to present application, the auxiliary intake assembly and the turbo boost can use a same air inlet, and independent air inlets can also be used. Additional air is inhaled into the auxiliary air inlet passage, and an additional air chamber is added and the air is pressurized. The pressurized air is fed into the intake pipe through the auxiliary air outlet passage. Meanwhile, the pressurized air drives the air in the intake pipe to accelerate flow when the air enters the intake pipe. A boost effect of the air flow of the original intake pipe is achieved, and the amount of air entered is remarkably increased. Further, it is convenient to install and dismount and clean.

BRIEF DESCRIPTION OF THE DRAWINGS

FIG. 18 is a diagram of an intake system of engine sharing one common air inlet according to a fifth embodiment of the present invention.

DETAILED DESCRIPTION

Figure 1:
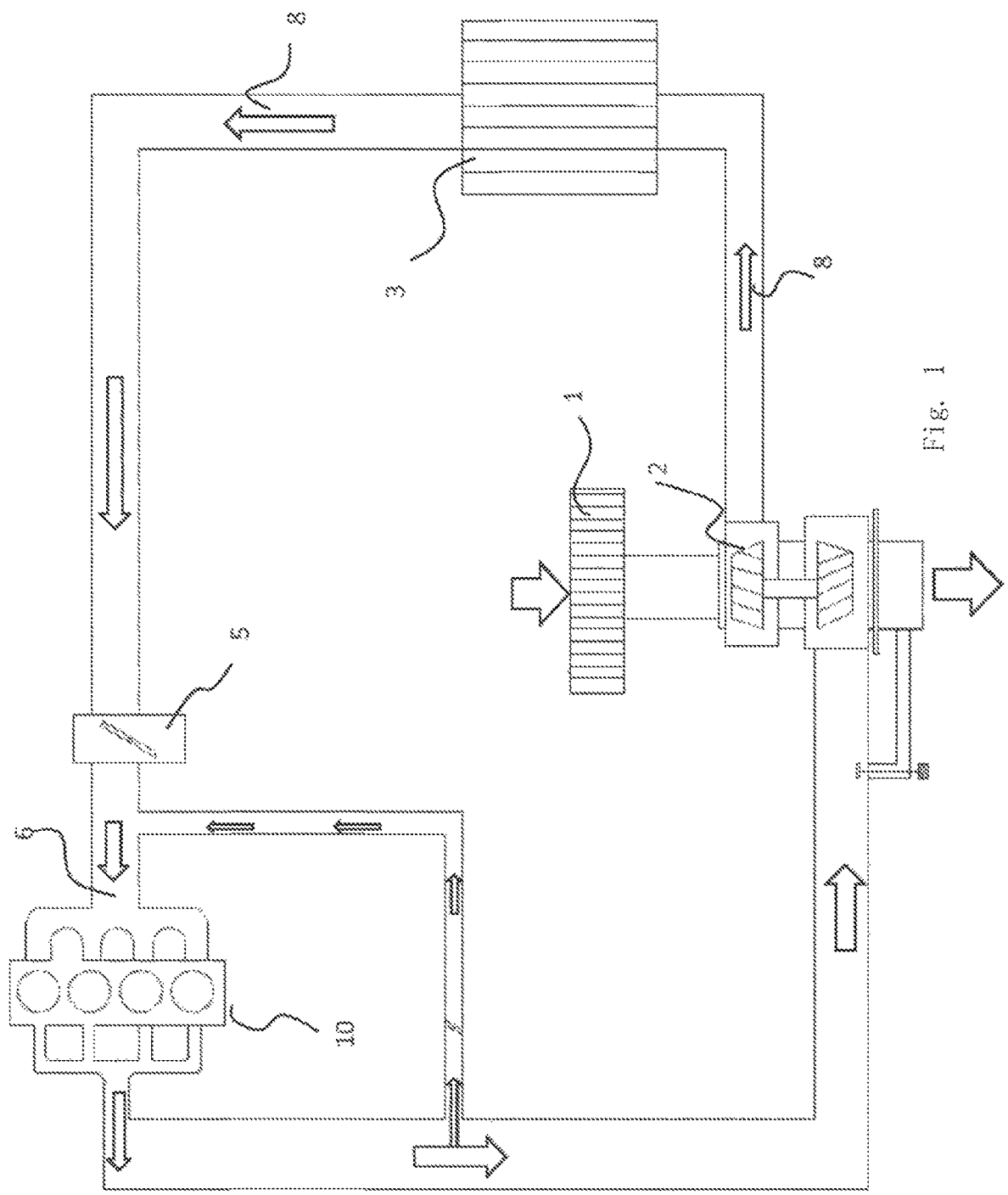
FIG. 1 is diagram of a typical intake system of engine with a turbocharger.

Preferred embodiments of the present invention will be described in detail with reference to the drawings, so that the purposes, the characteristics and the advantages of the invention can be more clearly understood. It should be understood that the embodiments shown in the drawings are not intended to limit the scope of the invention, but for describing the essential spirit of the technical scheme of the invention.

Figure 2:
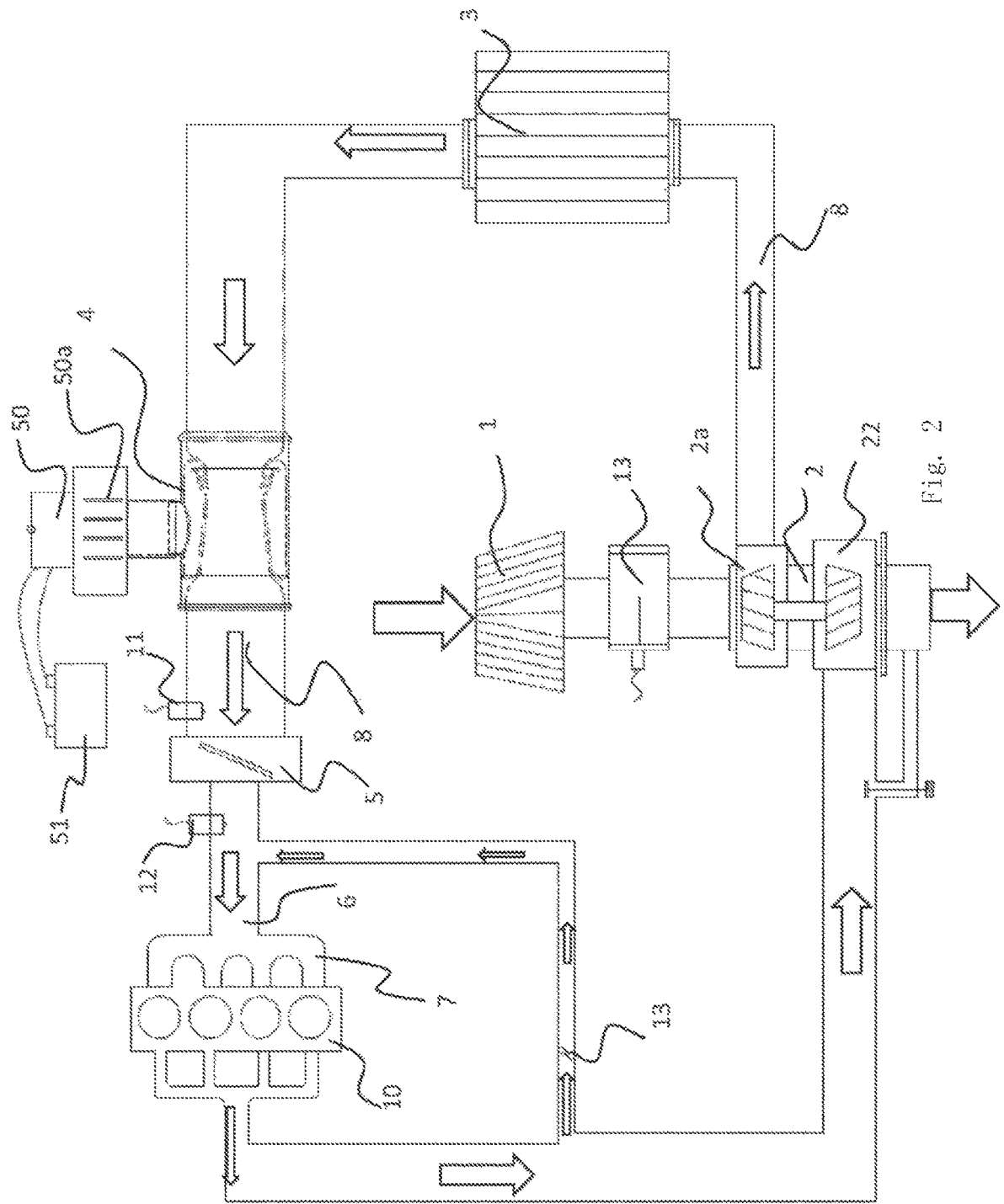
FIG. 2 is a diagram of an intake system of engine with an auxiliary intake assembly according to an embodiment of the present invention.

FIG. 2 is a schematic diagram of an intake system of engine 100 with an auxiliary intake assembly according to an embodiment of the present invention. As shown in FIG. 2, the intake system of engine 100 comprises an air filter 1, a turbocharger 2, an intercooler 3, an auxiliary intake assembly 4, an electronic throttle 5, an intake manifold main pipe 6 and an intake manifold 7 in sequence in the air flow direction, as well as a intake pipe 8 and an exhaust pipe 9 which connected with the components mentioned above. The air filter 1 is located at an inlet of the intake pipe 8. The auxiliary intake assembly 4 is arranged on a intake pipe between the intercooler 3 and the electronic throttle 5. In the embodiment, the auxiliary intake assembly 4 is used as a separate assembly which is connected to the intake pipe 8 in series after being manufactured. It should be understood that the auxiliary intake assembly or part thereof can be integrally formed on the intake pipe during manufacturing.

A boost pressure sensor 11 is arranged in a intake pipe between the electronic throttle 5 and the auxiliary intake assembly 4, and is used for detecting the actual pressure (also referred to as the boost pressure) in the intake pipe located upstream of the electronic throttle. An air inlet pressure sensor 12 is arranged in a pipe located downstream of the electronic throttle 5, and is used for detecting the pressure (namely the air inlet pressure) of the air inlet cavity at the downstream of the electronic throttle. A controller (not shown) of the auxiliary intake assembly 4 receives the air inlet pressure, the boost pressure, engine rotating speed, the position of the electronic throttle and other engine state information, controls the boost of the auxiliary intake assembly to form a closed-loop control on the target of the boost pressure. In addition, an air flow meter 13 is further arranged in the intake pipe between the air filter 1 and the turbocharger 2, and is used for detecting the amount of air entered. Some of the traditional intake system of engine further comprises an exhaust gas recirculation device (EGR) 14.

During operation, a first fresh air enters the engine intake pipe through the air filter 1, and then enters the air compressor end 2a of the turbocharger 2 through the air flow meter 13. Then, the high-temperature and high-pressure air is cooled into air with lowered temperature through the intercooler 3 after being supercharged by the air compressor 2a, and then the air enters the auxiliary intake assembly 4. Meanwhile, a second fresh air is inhaled by the air inlet of the auxiliary intake assembly 4. After being supercharged by the auxiliary intake assembly 4, the second fresh air and the first fresh air are combined into a pressurized air. Then, the pressurized air enters the intake manifold main pipe 6 after passing through the electronic throttle 5, and then is inhaled into an engine cylinder 10 after being distributed through an intake manifold 7.

Figure 2A:
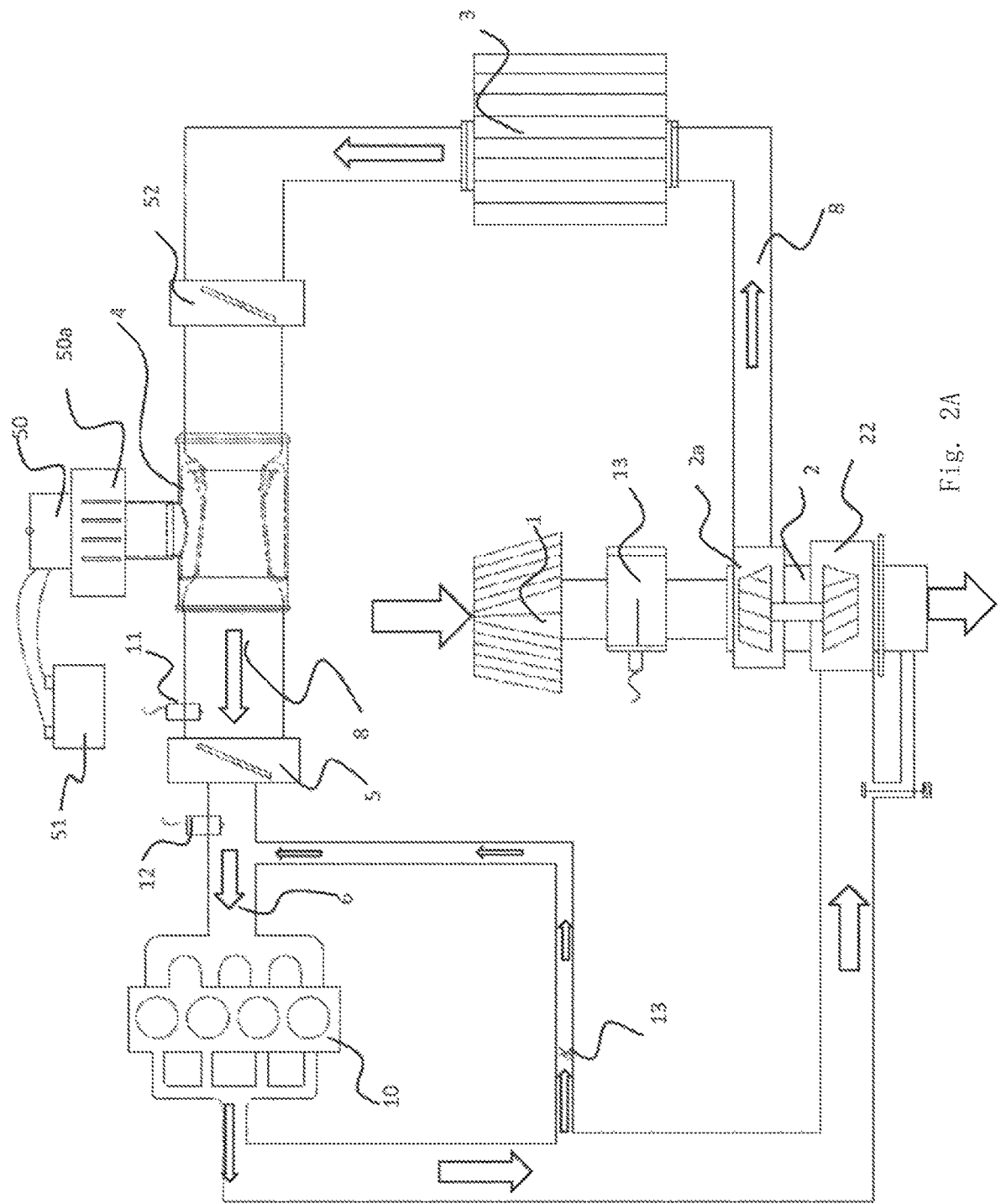
FIG. 2A is a system diagram of a variation of an intake system of engine with the auxiliary intake assembly of FIG. 2.

FIG. 2A is a system diagram of a variation of an intake system of engine with the auxiliary intake assembly of FIG. 2. The embodiment shown in FIG. 2A differs from the embodiment shown in FIG. 2 in that a second throttle 52 is further provided. The second throttle 52 is arranged in a intake pipe upstream of the auxiliary intake assembly 4. The function of the second throttle 52 is to prevent the air flow entering the main pipe through the auxiliary intake assembly from flowing back to the air inlet end of the upstream turbocharger through adjust the opening degree of the valve of the second throttle, so that the pressurized air provided by the auxiliary intake assembly effectively enters the cylinder, and the effect of rapid boost is achieved. Preferably, the second throttle 52 is arranged close to the auxiliary intake assembly. The distance between the second throttle 52 and the auxiliary intake assembly ranges from 5 mm to 500 mm.

Figure 3:
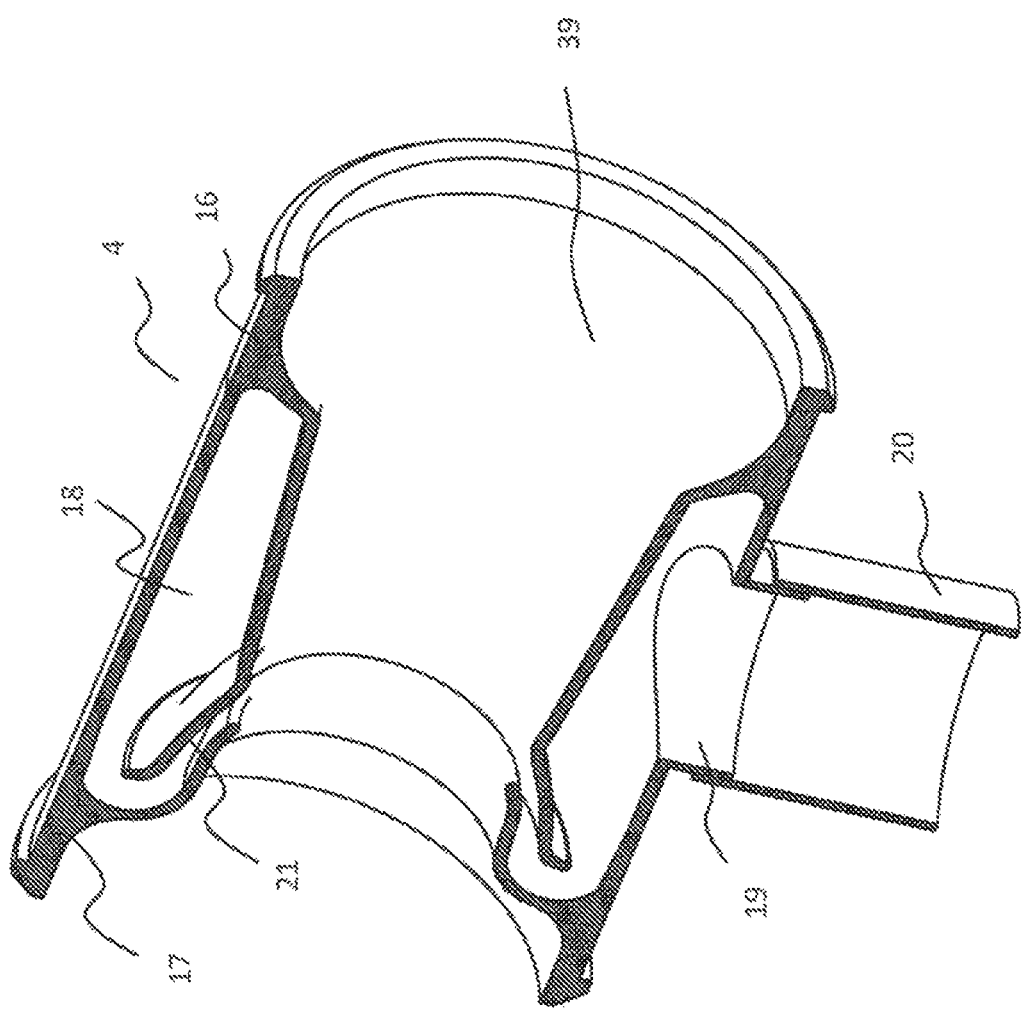
FIG. 3 is a cross-sectional perspective view of an auxiliary intake assembly according to an embodiment of the present invention.

FIG. 3 illustrates a cross-sectional perspective view of an auxiliary intake assembly 4 according to an embodiment of the present invention. As shown in FIG. 3, the auxiliary intake assembly 4 comprises an inner tube 16 and an outer tube 17. The inner tube and the outer tube define a central passage 39 together. The central passage 39 is communicated with the intake pipe 8, which will be further described.

One end of the inner tube 16 is hermetically connected to one end of the outer tube 17, and the other end of the inner tube 16 extends into the outer tube, so that an air chamber 18 is formed between the inner tube 16 and the outer tube 17. The pressure of the gas in the air chamber 18 is greater than the pressure of the gas in the intake pipe during operation, and therefore the air chamber 18 is also referred to as a boost cavity. An auxiliary air inlet 19 is formed on the side wall of the outer pipe 17, and the auxiliary air inlet 19 is communicated with an external air inlet pipe 20. The auxiliary air inlet 19 and the external air inlet pipe 20 jointly form an auxiliary air inlet passage. An auxiliary air outlet passage 21 is further formed between the inner tube 16 and the outer tube 17. The auxiliary air outlet passage 21 has a preset length and extends along the air flow direction of the intake pipe 8, so that the flow direction of the air flow coming out of the auxiliary air outlet passage 21 is basically parallel to the traveling direction of the air flow coming from the intake pipe 8. Air flow from an auxiliary air source (typically ambient air) enters through an auxiliary air inlet passage and flows through the air chamber 18, and then flows out from the auxiliary air outlet passage 21 and enters the central passage 39 and is mixed into the air flow of the intake pipe 8.

The air source can be directly supplied by surrounding air or can be supplied by an electric supercharger which has an impeller driven by a motor to rotate. Preferably, the air flow of the electric supercharger is an axial flow or a centrifugal flow when passing through the blades. Alternatively, the gas source may be provided by a compressor. Alternatively, the gas source can be from a gas released from a high-pressure air storage tank. Preferably, the high-pressure air storage tank can be inflated by a hydraulic pump or an electric pump. In one embodiment, the electric supercharger or the high-pressure air storage tank of the auxiliary intake assembly is driven by a vehicle-mounted battery, wherein a part of power of the vehicle-mounted battery is from a vehicle brake energy recycling system which is used for reversely charging the battery. In the embodiment shown in FIG. 2, the air source is from an electric supercharger which has an impeller driven by a motor to rotate. Specifically, as shown in FIG. 2, an air inlet of the auxiliary intake assembly is connected with a base 50. An air inlet 50a and an air outlet are formed in the base 50. The air inlet 50a is communicated with the surrounding air. The air outlet is connected to the air inlet of the auxiliary intake assembly. A fan, a motor and a controller (not shown) are arranged in the base 50. The controller controls the motor to rotate so as to drive the fan to rotate, such that the air is blew into the auxiliary intake assembly. The motor, the controller and the like are powered by a power supply device 51, and the power supply device is for example a battery, a super capacitor or a generator.

Figure 4:
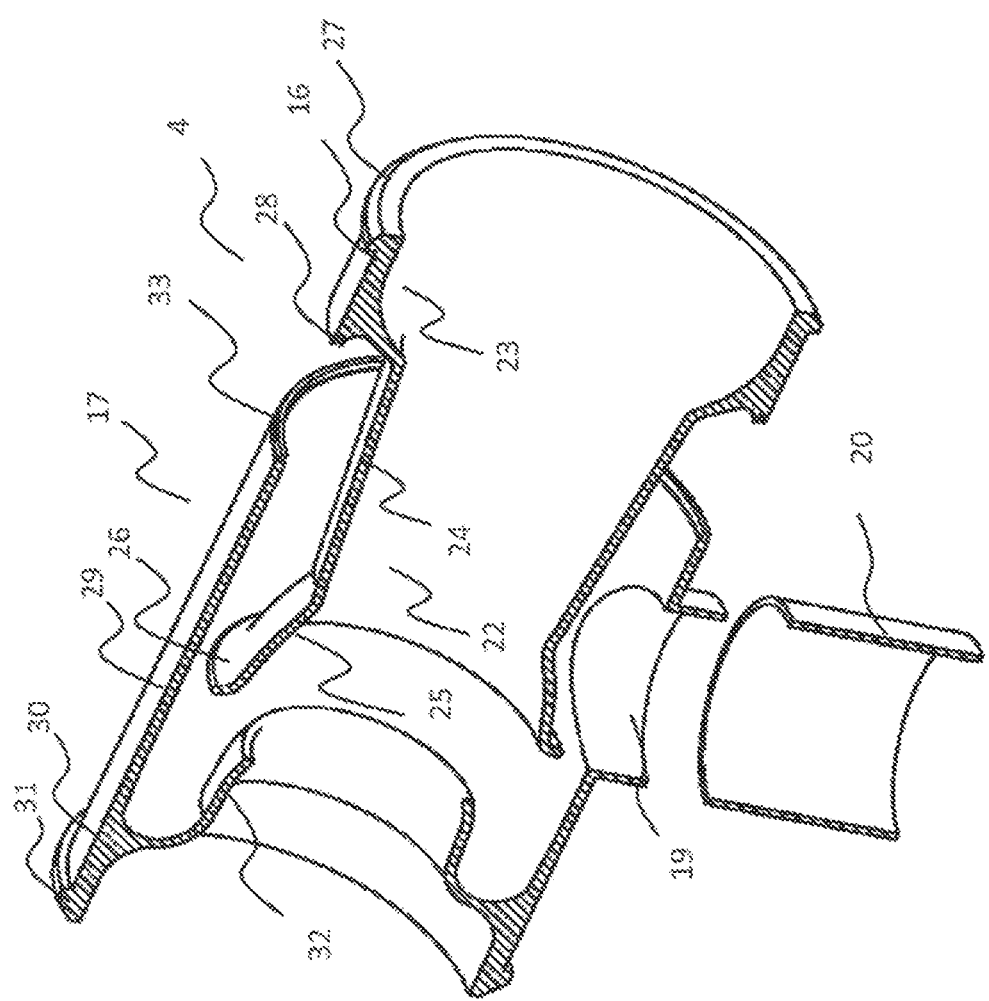
FIG. 4 is a sectional exploded view of the auxiliary intake assembly of FIG. 3.
Figure 5:
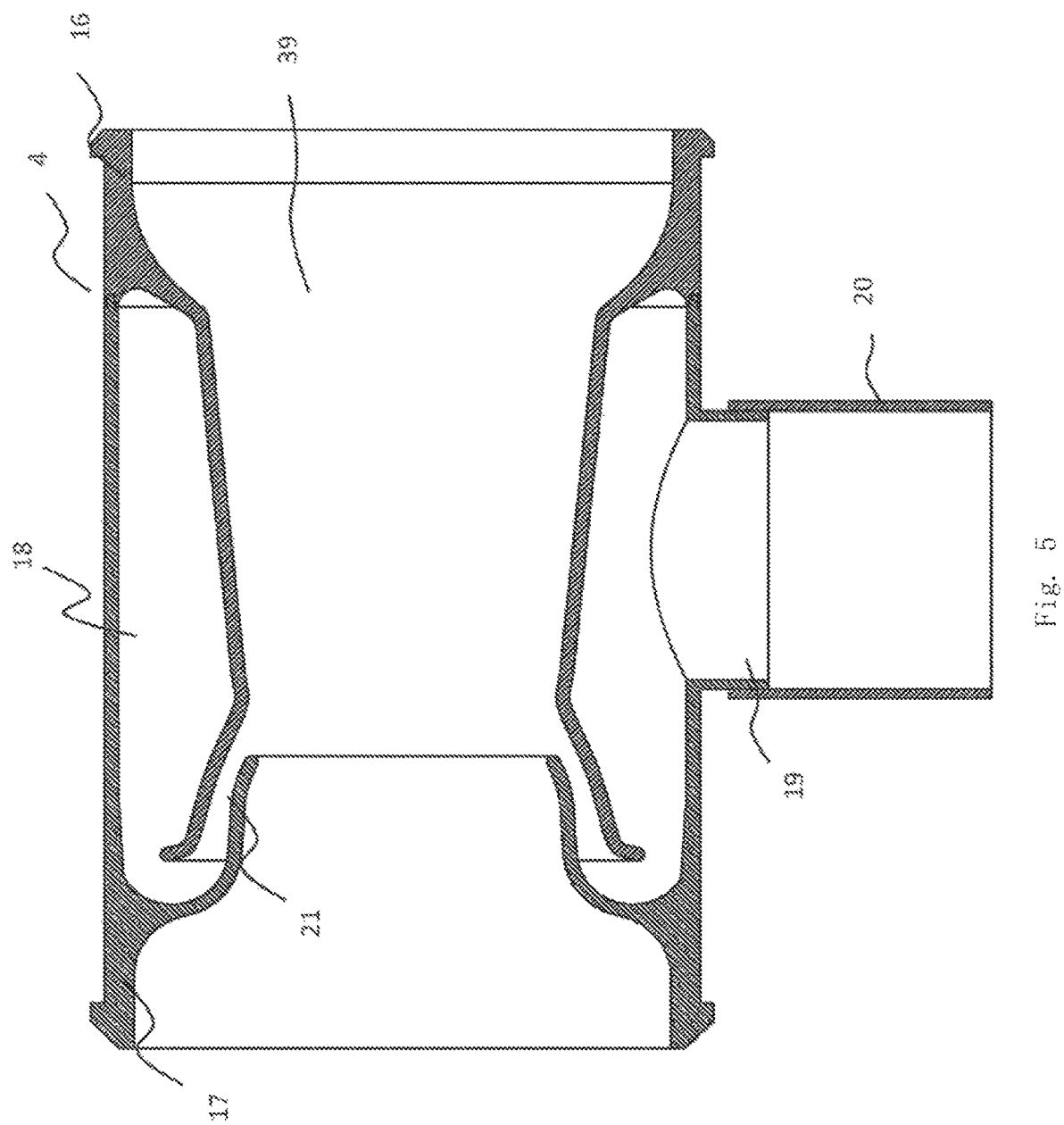
FIG. 5 is a cross-sectional plan view of the auxiliary intake assembly of FIG. 3.
Figure 6:
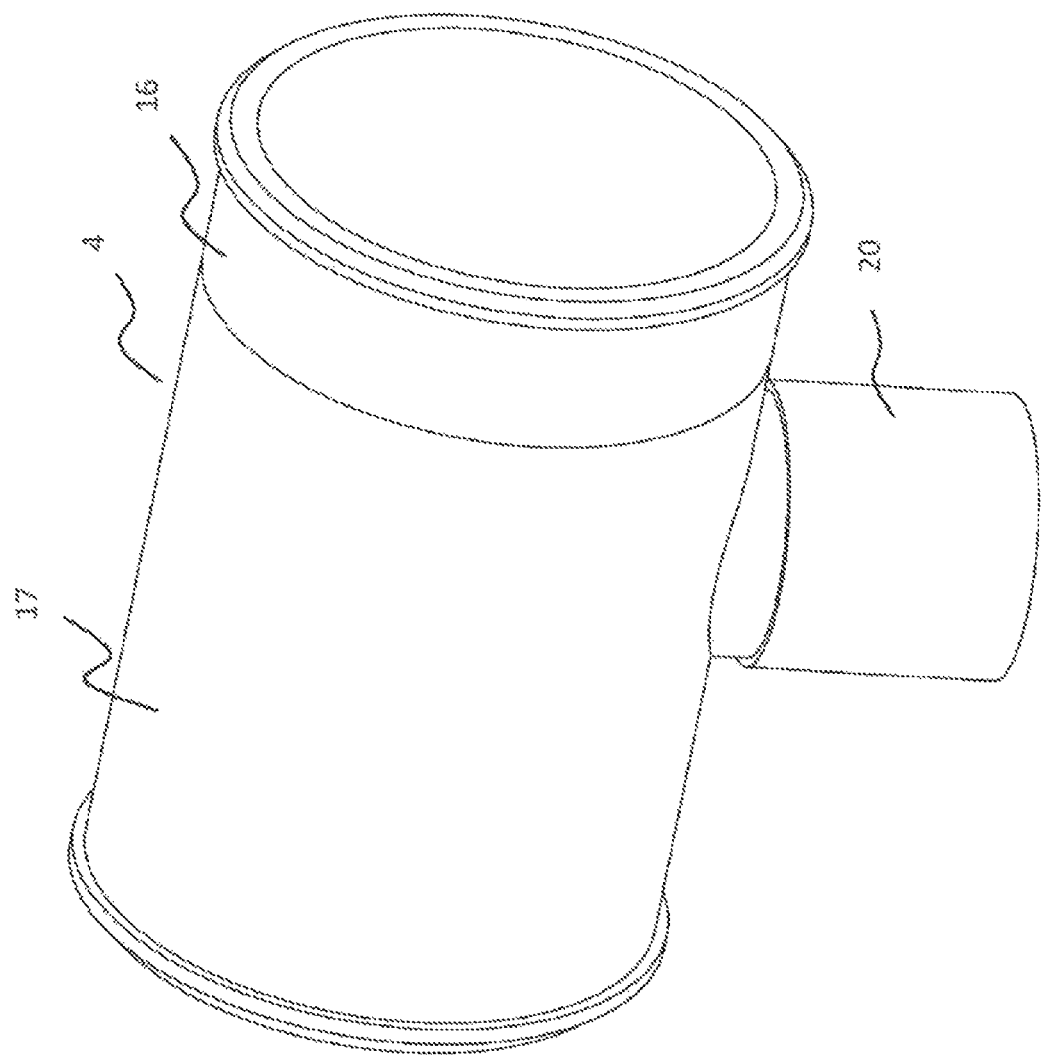
FIG. 6 is a perspective view of the auxiliary intake assembly of FIG. 3.

As shown in FIGS. 4-6, the inner tube 16 is provided with an inner annular flow guiding portion 22 and an inner annular connecting portion 23. The inner annular flow guiding portion 22 extends from the inner annular connecting portion 23 towards the outer annular connecting portion 30 of the outer tube 17, ie. extends in a direction opposite to the flow direction of the air flow in the intake pipe 8. The outer diameter of the inner annular flow guiding portion 22 is smaller than the inner diameter of the inner annular connecting portion 23. The outer diameter of the inner annular flow guiding portion 22 is smaller than the inner diameter of the tubular body of the outer tube 17, so that the inner annular flow guiding portion 22 can be contained in the outer tube 17.

The inner annular flow guiding portion 22 is provided with a first segment 24 and a second segment 25 extending from the inner annular connecting portion 23. The first segment 24 is trumpet-shaped and narrowed in a direction opposite to the flow direction of the air flow in the intake pipe. The second segment is gradually widened in the direction opposite to the flow direction of the air flow in the intake pipe and is in a trumpet-shape. It is understood that the first segment and/or the second segment can also be substantially cylindrical, that is, the diameter of the inner annular flow guiding portion in the extending direction is not changed.

The outer tube 17 is provided with a tubular body 29, an outer annular flow guiding portion 32 and an outer annular connecting portion 30. The outer annular flow guiding portion 32 is provided inside the tubular body 29 and extends from the outer annular connecting portion 30 towards the inner annular connecting portion 23, ie. the outer annular flow guiding portion 32 extends in a same direction as the flow direction of the air in the intake pipe 8. The inner side surface of the inner tube 16 and the inner side surface of the outer annular flow guiding portion 32 of the outer tube 17 form a central passage 39 together. The central passage 39 is communicated with the main air inlet passage of the intake pipe 8.

The outer diameter of the outer annular flow guiding portion 32 is smaller than the inner diameter of the second segment 25 of the inner annular flow guiding portion 22 of the inner tube 16. At least a portion of the inner annular flow guiding portion 22 surrounds at least a portion of the outer annular flow guiding portion to form an auxiliary air outlet passage 21. The auxiliary air outlet passage 21 is an annular passage and has a preset length. Preferably, the distance between the upper wall and the lower wall which define the annular passage is 0.3-5 mm. Preferably, the cross section of the annular passage is in an annular shape or an oval shape. The preset length of the auxiliary air outlet passage is 1 mm-25 mm. Preferably, the preset length is 5-20 mm. In another embodiment, the auxiliary air outlet passage 21 can be composed of a plurality of sections of narrow passages spaced apart from each other. In another embodiment, the auxiliary air outlet passage 21 is composed of a plurality of sections of separated arc-shaped passages.

The outer annular flow guiding portion 32 is gradually narrowed in the flow direction of the airflow in the intake pipe, and then the inner diameter thereof become smallest at the outlet of the auxiliary air outlet passage. In one embodiment, the length of the outer annular flow guiding portion 32 is smaller than the length of the inner annular flow guiding portion 22. In one embodiment, the length of the outer annular flow guiding portion 32 is smaller than or equal to the length of the second segment 25 of the inner annular flow guiding portion 32.

An annular flow guiding plate 26 is arranged at the inlet of the auxiliary air outlet passage 21 and is used for guiding airflow to flow towards the outlet of the auxiliary air outlet passage. As shown in FIG. 4, the annular guiding plate 26 extends integrally from the end of the second segment 25 of the inner tube 16. The surface of the annular flow guiding plate 26 is designed to guide the airflow to form a surface shape which can achieve a Coanda Effect.

An air chamber 18 is formed between the inner side surface of the tubular body of the outer tube and the outer surface of the inner annular flow guiding portion of the inner tube. The shape and the size of the air chamber are arranged to pressurize air entering from the auxiliary air inlet passage, and guide the air flow from the auxiliary air inlet passage towards the auxiliary air outlet passage. The auxiliary air inlet passage and the auxiliary air outlet passage are communicated through the air chamber 18. The auxiliary air outlet passage 21 is narrowed relative to the air chamber 18.

One end 28 of the inner annular connecting portion of the inner tube 16 is connected to one end 33 of the tubular body 29 of the outer tube 17, for example, through buckling connection, welding or bonding. The other end 27 of the inner annular connecting portion is connected to the intake pipe 8. One end of the inner annular flow guiding portion 22 is connected to (integrally formed in the drawings) the inner annular connecting portion 23 and the other end of the inner annular connecting portion 23 is a free end. An outer annular connecting portion 30 of the outer tube 17 is integrally formed with the tubular body 29 and the outer annular flow guiding portion 32. One end 31 of the outer annular connecting portion 30 is connected to the intake pipe 8. One end of the outer annular flow guiding portion 32 is connected to the outer annular connecting portion 30, and the other end of the outer annular flow guiding portion 32 is a free end.

It should be noted that in the embodiment shown in FIGS. 3-6, the inner tube is an integrated piece, and the outer tube is an integral piece. The inner tube and the outer tube are mutually connected hermetically to form the auxiliary intake assembly with the air chamber 18 and the auxiliary air outlet passage 21. It should be understood that the inner tube can be formed by a plurality of parts separately manufactured and then assembled. The outer tube can also be formed by a plurality of parts separately manufactured and then assembled. Alternatively, the outer tube and the inner tube can be integrally formed.

In addition, in the embodiment mentioned above, the auxiliary intake assembly is a separate independent component and is connected to the intake pipe in series. It is understood that all or a part of the auxiliary intake assembly can be integrally formed with the intake pipe.

When the auxiliary intake assembly works, the inhaled air is pressurized by the auxiliary intake assembly and then enters the auxiliary air outlet passage. The annular gap of the auxiliary air outlet passage enables the air to be squeezed at the annular gap, so that the air is accelerated to be blown out, and an overlapped air flow which has a flow direction consistent with the airflow direction in the original intake pipe is formed, and the air flow in the intake pipe is driven to accelerate to flow to the engine cylinder, so that boost is realized.

Figure 7:
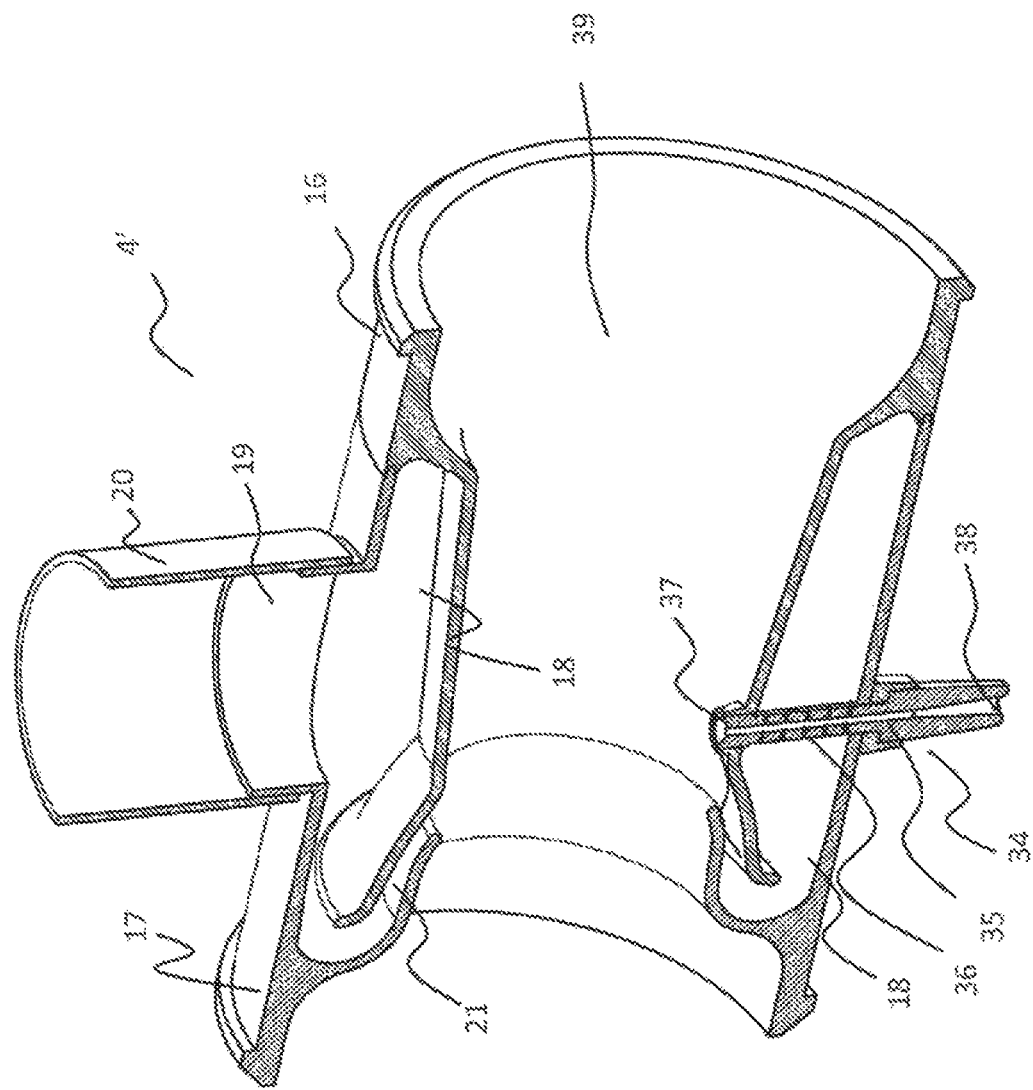
FIG. 7 is a cross-sectional perspective view of an auxiliary intake assembly according to another embodiment of the present invention.
Figure 8A:
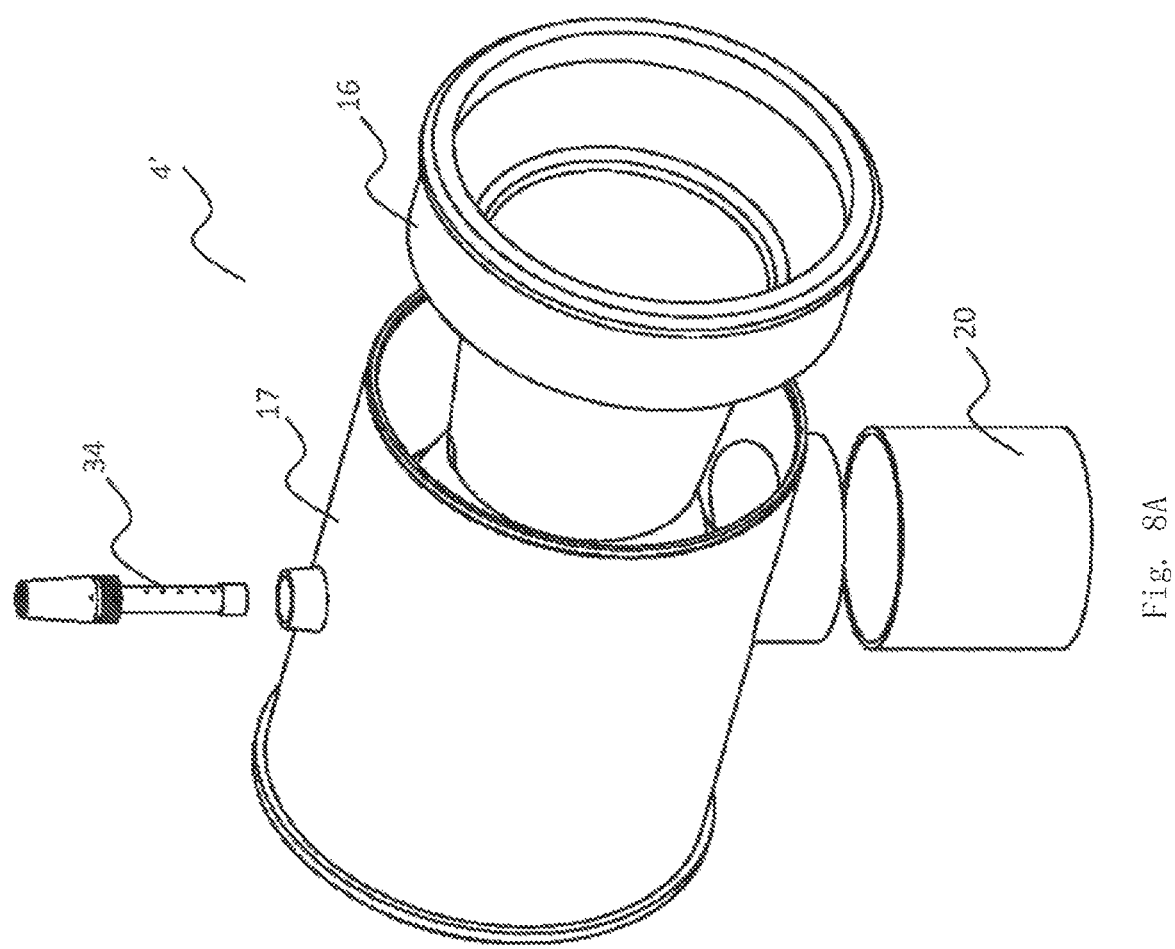
FIGS. 8A and 8B are exploded perspective and perspective views, respectively, of the auxiliary intake assembly of FIG. 7.
Figure 8B:
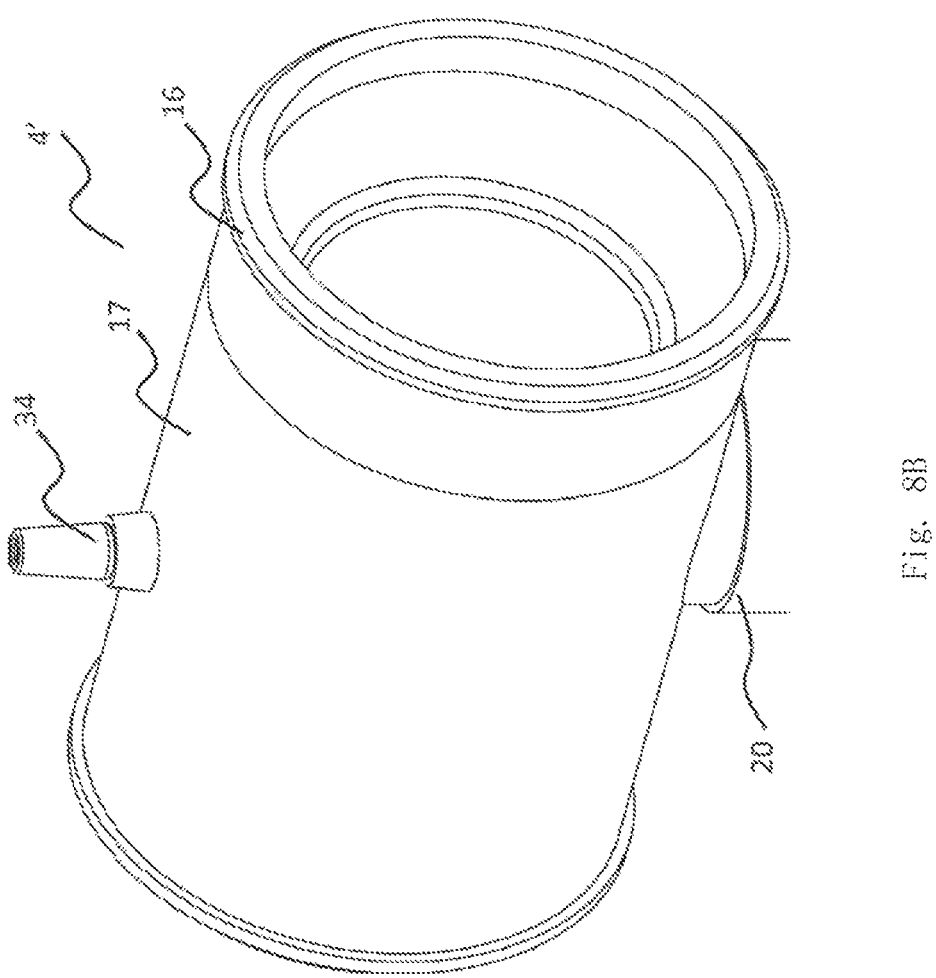

FIG. 7-8b show a structural schematic diagram of an auxiliary intake assembly 4' according to another embodiment of the present invention. the embodiment shown in FIG. 7-8b differs from the embodiment shown in FIG. 4 in that the embodiment shown in FIGS. 7-8b further provide a fluid adding device 34, and the rest is the same and is not described in detail herein. The fluid adding device 34 is used for adding fluid such as water, methanol or ethanol and mixtures thereof into the intake pipe, so that other functions such as auxiliary combustion can be realized. Preferably, under a low-speed and full-load working condition, in a single combustion, the mass ratio of atomized water to gasoline in the cylinder is 1:3. Preferably, the auxiliary air inlet can be pressurized after the engine is shut down, such that liquid water in the nozzle and the pipe is reversely pressed back into a water tank or pulled out, thus residual liquid water in the pipe can be prevented from being frozen, and the residual liquid water in the pipe can be prevented from going bad in the pipe for a long time.

In the embodiment shown in FIG. 7, the fluid adding device 34 is a nozzle 34. The nozzle 34 is detachably installed on the auxiliary intake assembly 4. The nozzle is located on the air outlet side of the auxiliary air outlet passage 21, passes through the outer tube 17, the air chamber 18 and the inner tube 16, and then is communicated with the central passage 39. In particular, a passage 35 is defined inside the nozzle 34 for liquid to be transferred from the inlet 38 of the nozzle to the outlet 37 of the nozzle. At least one air inlet hole 36 is defined on the nozzle side wall 40 defining the passage 35. The air inlet hole 36 is in fluid communication with the air chamber 18. The outlet 37 of the nozzle 34 is in communication with the central passage 39. The inlet 38 of the nozzle 34 is connected to a liquid source 41 (see FIG.), so that the nozzle 34 sprays the liquid from the liquid source into the intake pipe 8.

In the embodiment, the nozzle 34 inhale liquid into intake pipe through the pressure difference generated by the internal air flow of the auxiliary intake assembly. The liquid is atomized and then is mixed with air in the intake pipe and then inhaled into the cylinder together. In one embodiment, the pressure difference ranges from 10 KPa to 100 KPa. Preferably, the pressure difference is 35-75 KPa.

Preferably, the outlet 37 of the nozzle 34 is located on one side, which is close to the cylinder, of the auxiliary air outlet passage 21 and is separated from the outlet of the auxiliary air outlet passage by a preset distance. Preferably, the predetermined distance is set such that the air flowing out of the auxiliary air outlet passage can directly act on the liquid flowing out of the outlet of the nozzle to atomize the liquid. Preferably, the preset distance is 2-50 mm, and more preferably, the preset distance is 5-15 mm.

In FIG. 7, ten air inlets 36 are shown. It should be understood that the amount of the air inlet holes 36 can be two, four or six or other suitable amounts. The diameter of the air inlet hole is 0.3-1 mm. Preferably, the diameter of the air inlet hole is 0.75 mm.

In one embodiment, the liquid flowing inside the nozzle is pure water, and the nozzle is used for humidifying air in the intake pipe. In another embodiment, the liquid flowing inside the nozzle is a mixture of water and methanol or ethanol, wherein methanol or ethanol has the effects of combustion improver and inhibition of icing when at low-temperature. In one embodiment, the liquid source is a liquid source with pressure, or a pipe between the inlet of the nozzle and the liquid source is provided with a pressure pump.

Figure 9:
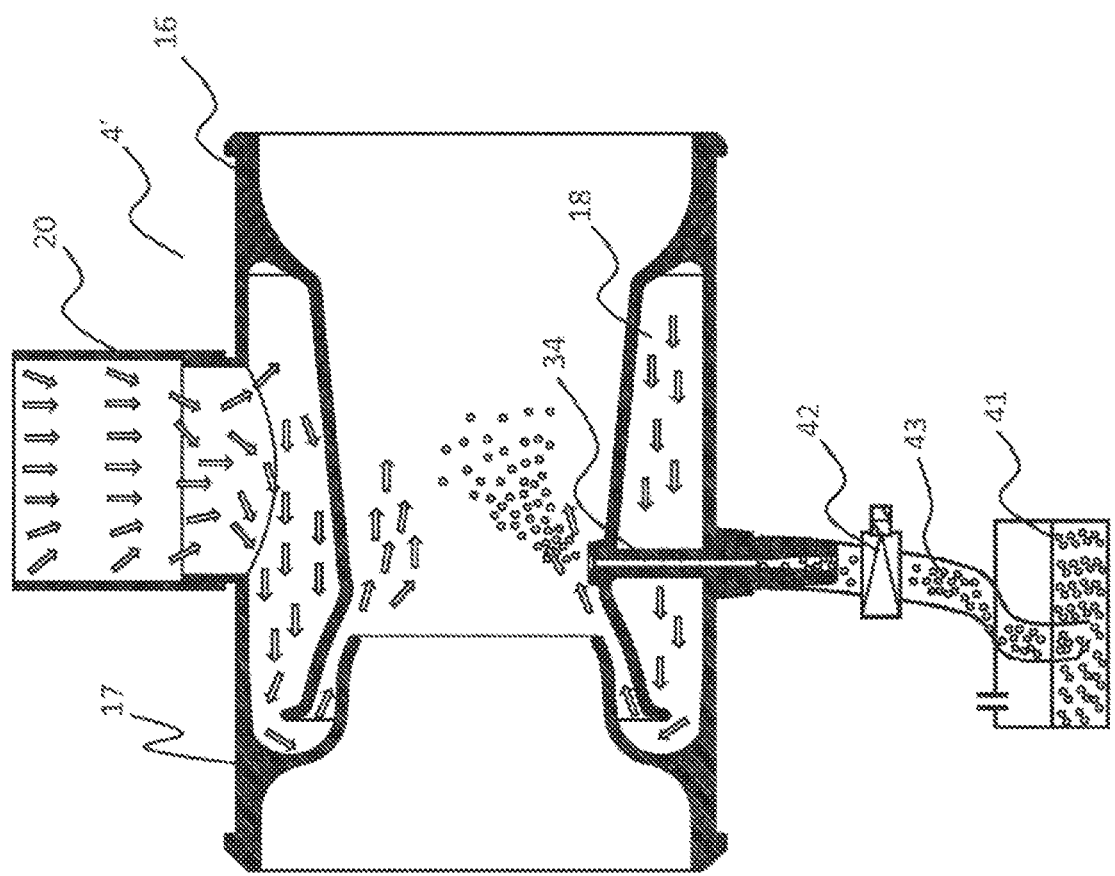
FIG. 9 is a structure and operation schematic diagram of an auxiliary intake assembly provided with a fluid adding device according to an embodiment of the present invention.

As shown in FIG. 9, a flow control valve 42 is arranged on a pipe 43 between the inlet of the nozzle 34 and the liquid source 41, such as an electromagnetic valve, and is used for controlling the liquid flow. The liquid source 41 is a water tank. The water tank 41, the pipe 43, the flow control valve 42 and the nozzle 34 form a liquid adding device together.

Figure 10:
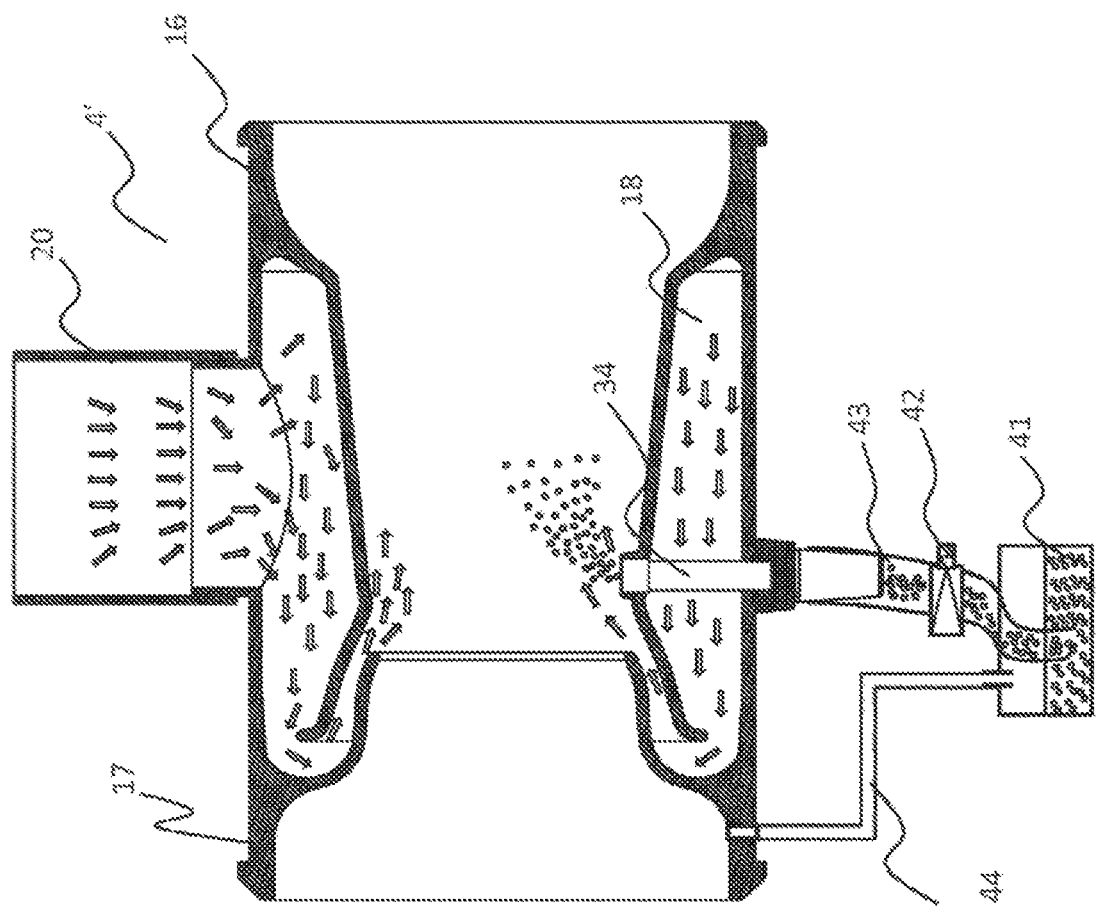
FIG. 10 is a structure and operation schematic diagram of an auxiliary intake assembly provided with a fluid adding device according to another embodiment of the present invention.

In one variation, there may be no air inlet hole on the side wall of the nozzle, and the fluid adding device sprays liquid into the pipelines of the auxiliary intake assembly through the nozzle using a siphon principle. For example, as shown in FIG. 10, the auxiliary intake assembly 4' is also provided with a vent pipe. One end of the vent pipe 44 is communicated with the intake pipe 8 or a central passage 39 upstream of the auxiliary intake assembly, and the other end of the vent pipe 44 is communicated with a pipe 43 between the nozzle 34 and the liquid source 41, or the other end of the vent pipe 44 is communicated with the sealed liquid source storage tank. The pressure upstream of the auxiliary intake assembly 4' is larger than the pressure of the outlet of the auxiliary air outlet passage. The liquid is inhaled into the nozzle upwards and is sprayed out from the outlet of the nozzle, and meanwhile, the liquid is atomized.

In the embodiments above, the liquid source needed by the nozzle can be rainwater guided and collected from the front windshield of the vehicle, or can be water discharged from the exhaust manifold of the vehicle, or can be condensed water accumulated outside the condenser of the air conditioning condenser, or can be water manually injected into the water tank.

In one embodiment, a plurality of nozzles are provided along the circumference of the auxiliary intake assembly. Generally the plurality of nozzles are provided along the circumference of the outer tube. In another embodiment, the nozzle is simultaneously used as a connector for the inner tube and the outer tube.

The fluid adding device provided on the intake system of engine has the following main advantages:
1. Air inhaled into the cylinder is cooled, and the density of the air entered is improved, and then the amount of the air entered is increased.
2. Suppressing knocking and preburning by reducing temperature in cylinder.
3. The compression ratio of the engine is improved, and the engine is enabled to generate larger torque.
4. Simple and efficient fuel consumption method, and especially low-rotation-speed large-load working condition
5. The exhaust temperature is achieved through water spraying, especially at the working condition of high-rotating-speed and large-load working conditions, thus reducing the exhaust temperature by spraying concentrated gasoline, like the traditional engine, is avoided and meanwhile, the fuel-saving effect is achieved.

Figure 11:
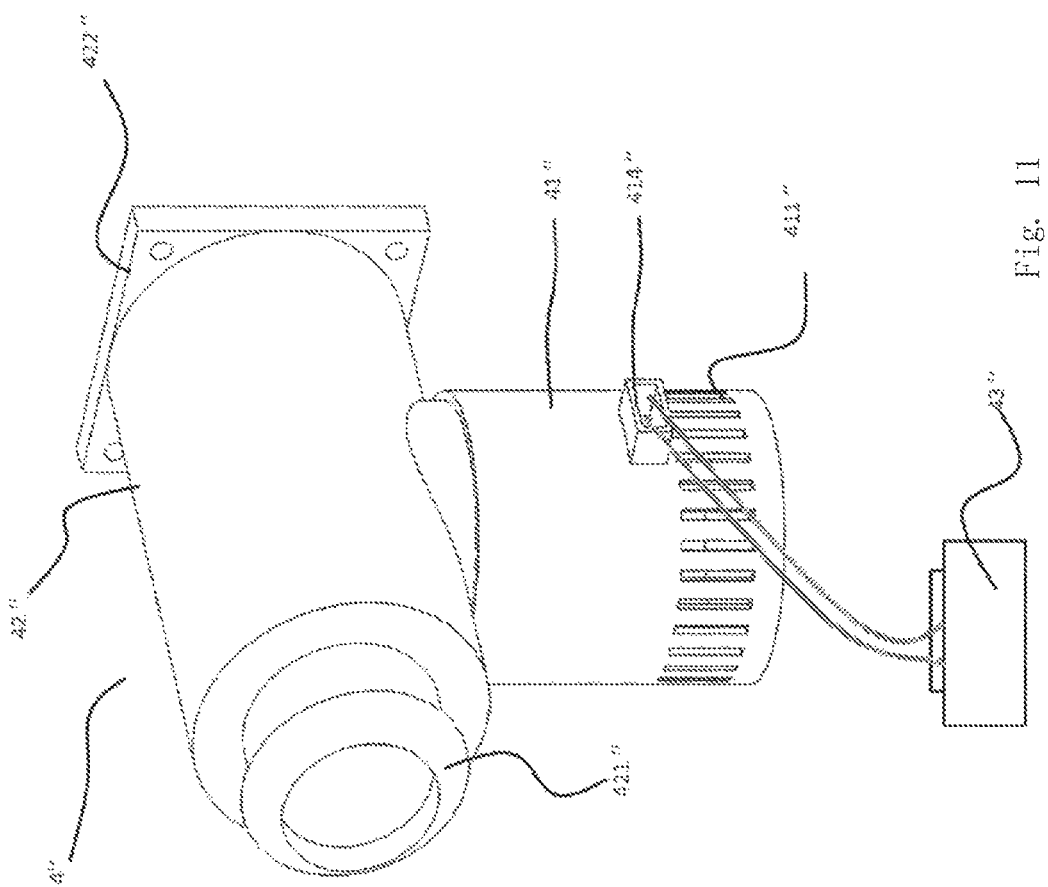
FIG. 11 is a perspective view of an auxiliary intake assembly according to yet another embodiment of the present invention.
Figure 12:
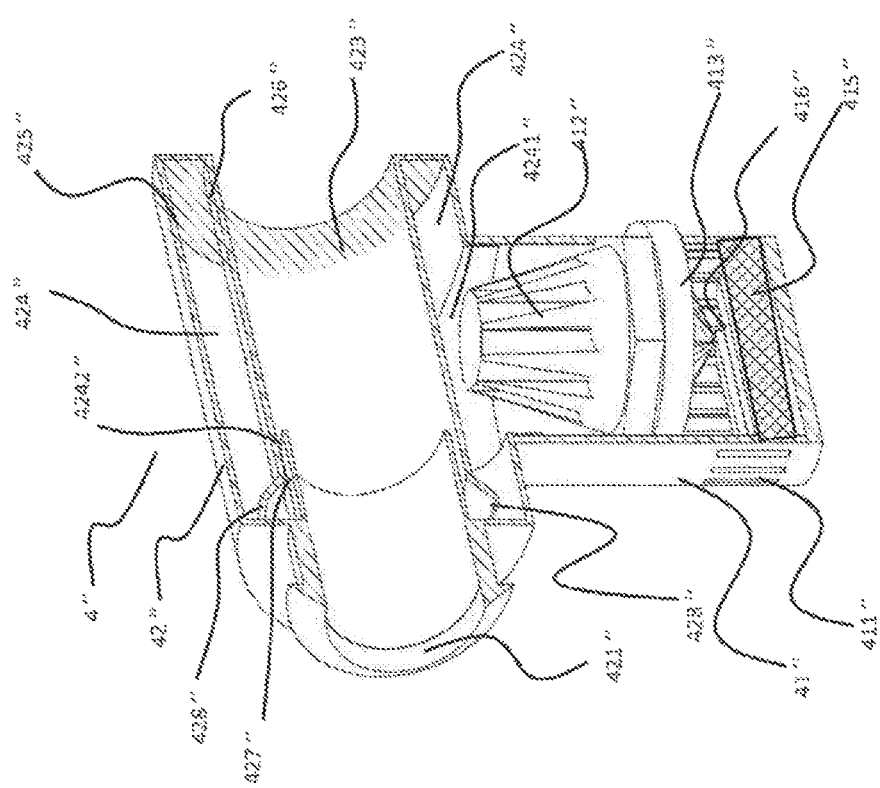
FIG. 12 is a cut-away view of the auxiliary intake assembly of FIG. 11, and part of the structure is not shown for clarity.

FIG. 11-14 is a perspective view of an auxiliary intake assembly 4" according to yet another embodiment of the present invention. As shown in FIGS. 11 and 12, in the embodiment, the auxiliary intake assembly is in the form of an electric supercharger 4". Therefore, in the following description of the embodiment, the auxiliary intake assembly is referred to as an electric supercharger 4". The electric supercharger 4" comprises a base 41" and a boost pipe 42" which is in fluid communication with the base. The side wall of the base 41" is provided with an air inlet 411". Preferably, the air inlet 411" is arranged around a housing of the base. A second air filter 415" is further arranged in the base 41" and is used for filtering the air entering the base.

A motor 412" and fan blades 413" are arranged in the base. The motor 412" is connected with a vehicle-mounted battery (not shown) so as to obtain power supply and is connected with the motor controller 43" so as to be controlled. Preferably, the motor is a switched reluctance motor. Preferably, the motor 411" is located on the air outlet side of the fan blade, namely behind the fan blade. The motor drives the fan to rotate, and air flow stirred by the fan enters through the front of the fan blade and is discharged from the rear of the fan blade. The airflow blown out by the fan blows through the motor and then enters the airflow pipe, and the purpose of cooling the motor can be achieved since the motor is located behind the fan blades. Meanwhile, the motor housing plays a role in guiding the air flow blown out by the fan. Preferably, the motor housing is provided with a blade-shaped flow guide.

An interface 414" is arranged on the base 41' and is used for being connected with a motor controller 38". The motor controller 38" can be in communication with a control system (not shown) of a vehicle. Preferably, the motor control function can also be integrated in an engine control unit (ECU). The ECU directly controls the electric supercharger to work according to the running state of the engine.

The boost pipe 42" is a tubular member, which is connected in series with an intake pipe of the engine and is in fluid communication with the intake pipe. Specifically, one end of the boost pipe 42" is provided with a buckle 421", and a flange 422" is arranged at the other end. One end of the intake pipe located on the air filter side is connected with the boost pipe in series through the buckle, and the other end of the intake pipe positioned at the cylinder side is connected with the boost pipe in series through a flange and a bolt. In another embodiment, one end of the intake pipe located on the air filter side is connected with the boost pipe in series through a silica gel pipe, and is fixed through a hoop. The other end of the intake pipe positioned at the cylinder side is provided with a flange, and the corresponding end of the boost pipe is also provided a flange, wherein the intake pipe is connected with the boost pipe through the flanges and bolts. In another embodiment, the intake pipe and the boost pipe are both provided with flanges, and the intake pipe and the boost pipe are connected through flanges and bolts.

A first airflow passage 423" which is in fluid communication with the intake pipe is arranged in the center of the boost pipe 42". A second airflow passage 424" is formed between the inner tube wall 426" defining the first airflow passage 423" and the outer tube wall 425" of the boost pipe. The air inlet 4241" of the second airflow passage 424" is in fluid communication with the base 41", and an air outlet 4242" of the second airflow passage is in fluid communication with the first airflow passage 423".

Figure 13:
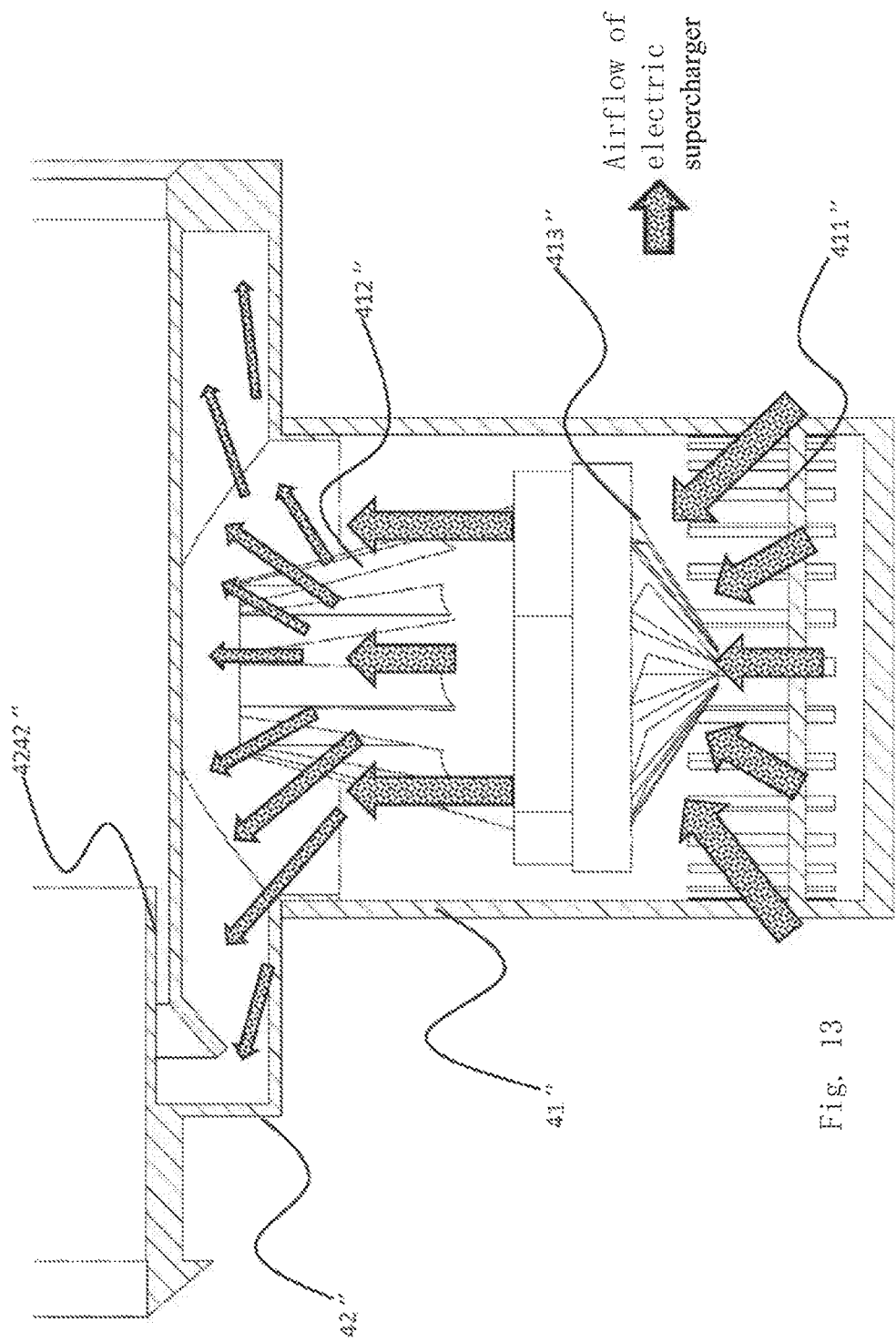
FIG. 13 is a schematic diagram of an air flow inside a base of the auxiliary intake assembly of FIG. 11, wherein only a part of the structure of the electric supercharger is shown.
Figure 14:
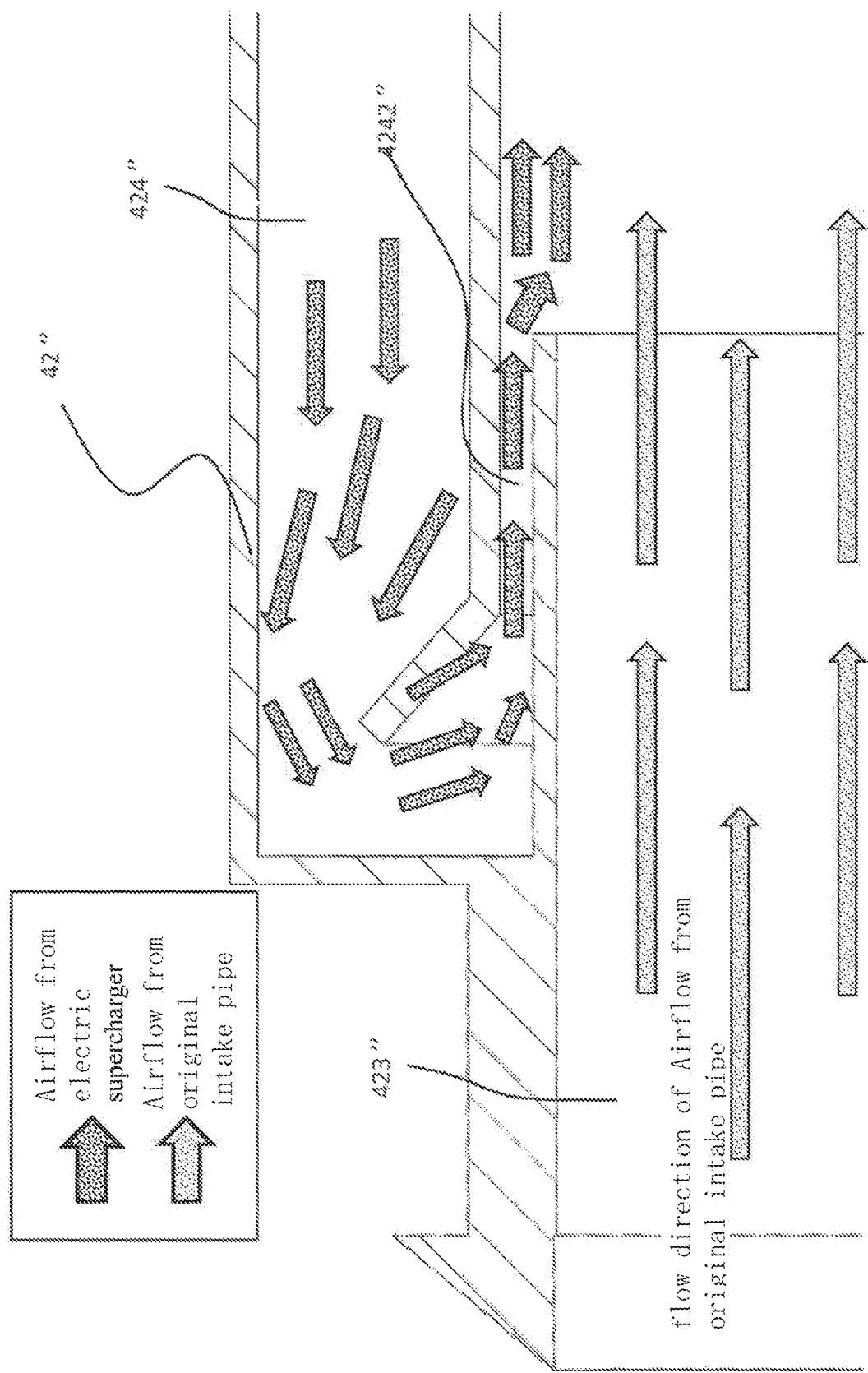
FIG. 14 is a schematic diagram of an internal air flow of the auxiliary intake assembly of the present invention, wherein only a part of the structure of the auxiliary intake assembly is shown.

During operation, the motor 412' drives the fan blades 413' to rotate, so that the air flow (eg, ambient air or other gas) flows through the air inlet 4241", and flows out from the air outlet 4242" and is mixed with the air flowing through the intake pipe so as to form a boost gas which is inhaled into the cylinder of the engine, as shown in FIGS. 13 and 14.

In the embodiment shown in FIGS. 11 and 12, the air outlet of the boost pipe 42" is an annular gap 4242". An inlet of the annular gap 4242" is in fluid communication with the base 41" via a second airflow passage 424". The outlet of the annular gap is oriented in the same direction as the direction of airflow entering the intake pipe (ie, towards the cylinder side). The space formed by the annular gap plays a role in guiding airflow to flow towards the cylinder. It should be noted that the gap may also be a gap other than the annular gap, as long as it is a segment of narrow space smaller than the second airflow passage. Alternatively, a plurality of gaps which are not communicated with each other are formed around the inner wall of the first airflow passage.

In other words, the gap may be a segment of small narrow space which connects the second air flow passage to the first air flow passage (or an engine intake pipe) of the electric supercharger. The airflow in the second airflow passage can flow out of the second airflow passage through the gap and enters the first airflow passage, and then enters the intake pipe and flows in the air flowing direction in the intake pipe.

Preferably, the cross section of the annular gap is circular or oval. Preferably, the size w of the annular gap is 0.3-5 mm. Preferably, the size of the gap is 1-4 mm.

In one embodiment, the annular gap 4242" is defined by a section of the annular inner wall of the first airflow passage and a section of annular wall 427' which extends internally from one end of the boost pipe connected with the air filter side. An annular flow guiding plate 428" is arranged at the inlet of the annular gap 4242" and is used for guiding airflow to flow towards the outlet of the annular gap.

It should be noted that, in the embodiment, the air outlet of the second airflow passage is an annular gap 4242". However, one of ordinary person skilled in the art will understand that the air outlet of the second air flow passage can also be composed of one or more arc-shaped gaps or other shape gaps, as long as the shape of the air outlet is capable of enabling air flow (air) to be squeezed at the outlet, such that the air flow is accelerated to be blown out, and an combined air flow which has a same flow direction as the airflow direction in the original intake pipe is formed, and the air flow in the original intake pipe is driven to be accelerated to flow to the engine cylinder, so that boost can be realized.

When the electric supercharger works, the inhaled air is guided to the air outlet of the electric supercharger through the second air flow passage after being supercharged by the electric supercharger. The annular gap (annular notch) of the air outlet enables the air to be squeezed at the outlet, so that air is blown out accelerated, and an combined air flow which has a same flow direction as the airflow direction in the original intake pipe is formed, and the air flow in the original intake pipe is driven to be accelerated to flow to the engine cylinder, so that boost can be realized, as shown in FIG. 13.

When the electric supercharger stops working, due to the bernoulli effect, when the air in the intake pipe of the engine flows, a negative pressure area can be formed at the annular gap, so that air in the electric supercharger communicated with the outside air is inhaled into the intake pipe through the annular gap, and the amount of air entering the cylinder is increased.

According to a preferred embodiment, the electric supercharger is further internally provided with a heating device 416", wherein the heating device is used for heating air inhaled into the electric supercharger. Preferably, the heating device is a heating wire or a PTC ceramic material. Preferably, the heating device is electrically connected with the vehicle-mounted battery. Preferably, the heating device is installed in the base and is located at front of the fan of the electric supercharger. Air inhaled by the base passes through the fan blades firstly and then is heated by the heating device, and then enters the airflow pipe. In another embodiment, the heating device can be installed in the base and located at the air inlet, wherein the air inhaled by the base is heated through the heating device firstly and then enters the airflow pipe through the fan blades.

According to present application, the heating energy and the heating time of the heating device are determined by the actual working condition of the engine, especially when the engine is in a low-temperature cold starting state, the heating air is inhaled into the cylinder, so that the cold starting emission of the engine can be effectively improved, and the starting period is shortened.

Figure 15:
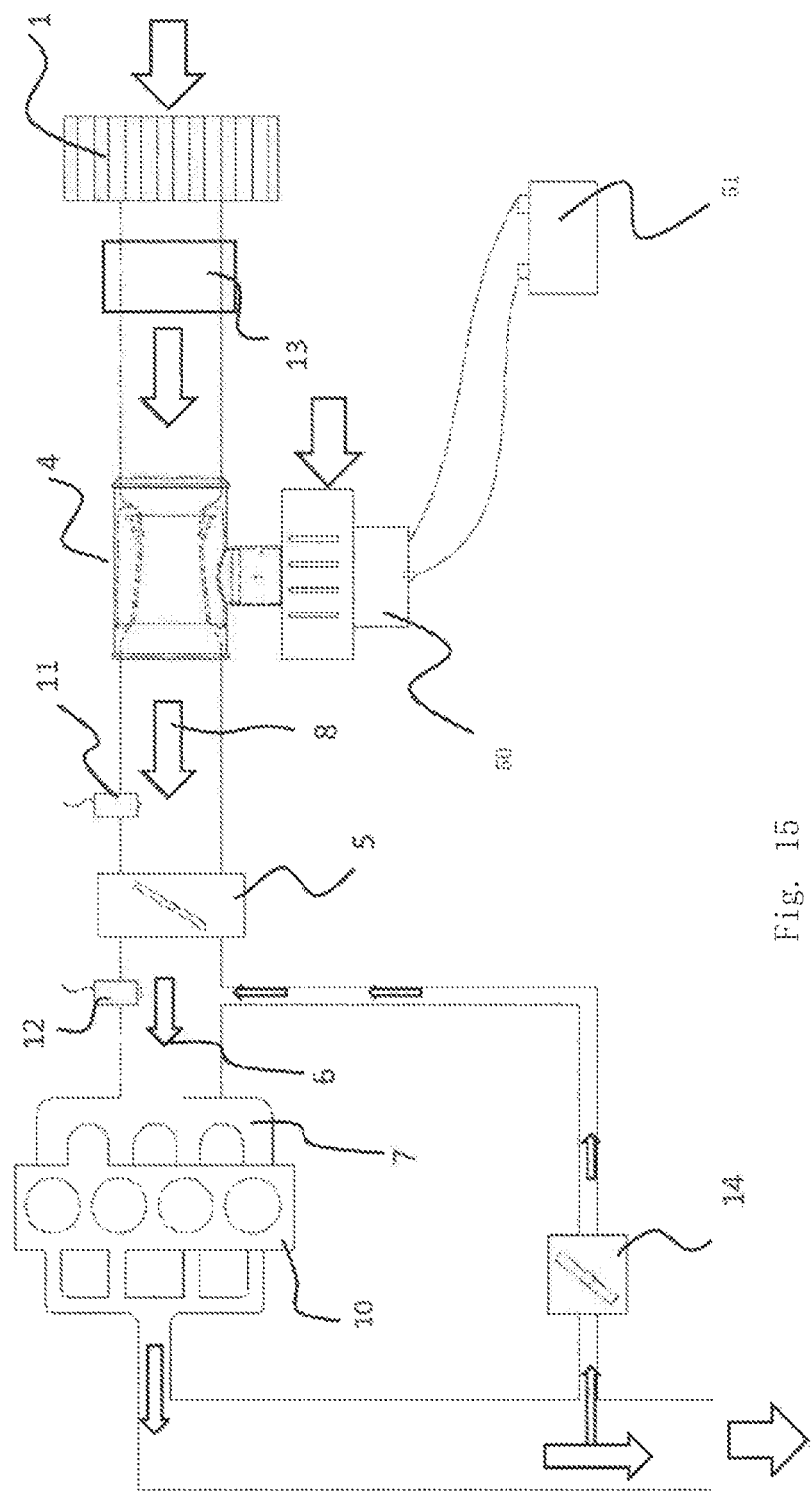
FIG. 15 is a diagram of an intake system of engine with an auxiliary intake assembly according to a second embodiment of the present invention.

FIG. 15 is a diagram of an intake system of engine with an auxiliary intake assembly according to a second embodiment of the present invention. The main difference between present embodiment and the embodiment shown in FIG. 2 is that the application of the auxiliary intake assembly 4, 4' and 4". In the embodiment, the auxiliary intake assembly 4, 4' and 4" are applied to the naturally-aspirated engine (NA engine). In the above embodiment, the auxiliary intake assemblies 4, 4' and 4" are applied to a turbocharged engine with a turbocharger. In present embodiment, the auxiliary intake assembly 4, the structure of the 4' and the 4" is the same as the structure of the previous embodiment, and the structure is not described in detail herein.

In the embodiment, the auxiliary intake assembly 4, 4' and 4" are installed on a intake pipe 8 located on front of the electronic throttle 5. Herein, the term "the front", "the rear", "front en" and "rear end" refer to upstream or downstream position according to the air inlet flow direction of the engine. The definition of the front of the electronic throttle 5 should not be limited to the position at the downstream of the air filter in FIG. 2, and also comprises an auxiliary intake assembly 4, 4' and 4" which are arranged at upstream of the air filter 1, which also fall into the scope of the present application.

During operation, fresh air enters the intake pipe 8 through air filtration, and then enters the auxiliary intake assemblies 4, 4' and 4". Meanwhile, the second fresh air is inhaled by the air inlets 50a of the auxiliary air inlet assemblies 4, 4' and 4" and is pressurized by the auxiliary intake assembly, and then passes through an air flow meter (the air flow meter is used as an option and can be cancelled), and then enters the engine intake manifold main pipe 6 through the electronic throttle 5, and then enters the cylinder 10 after being distributed through the intake manifold 7. The controller of the auxiliary intake assembly receives the air pressure, the engine rotating speed, the position of the electronic throttle and other engine state information, and controls the boost of the auxiliary intake assembly to form a closed-loop control on the target pressure of the boost.

Figure 16:
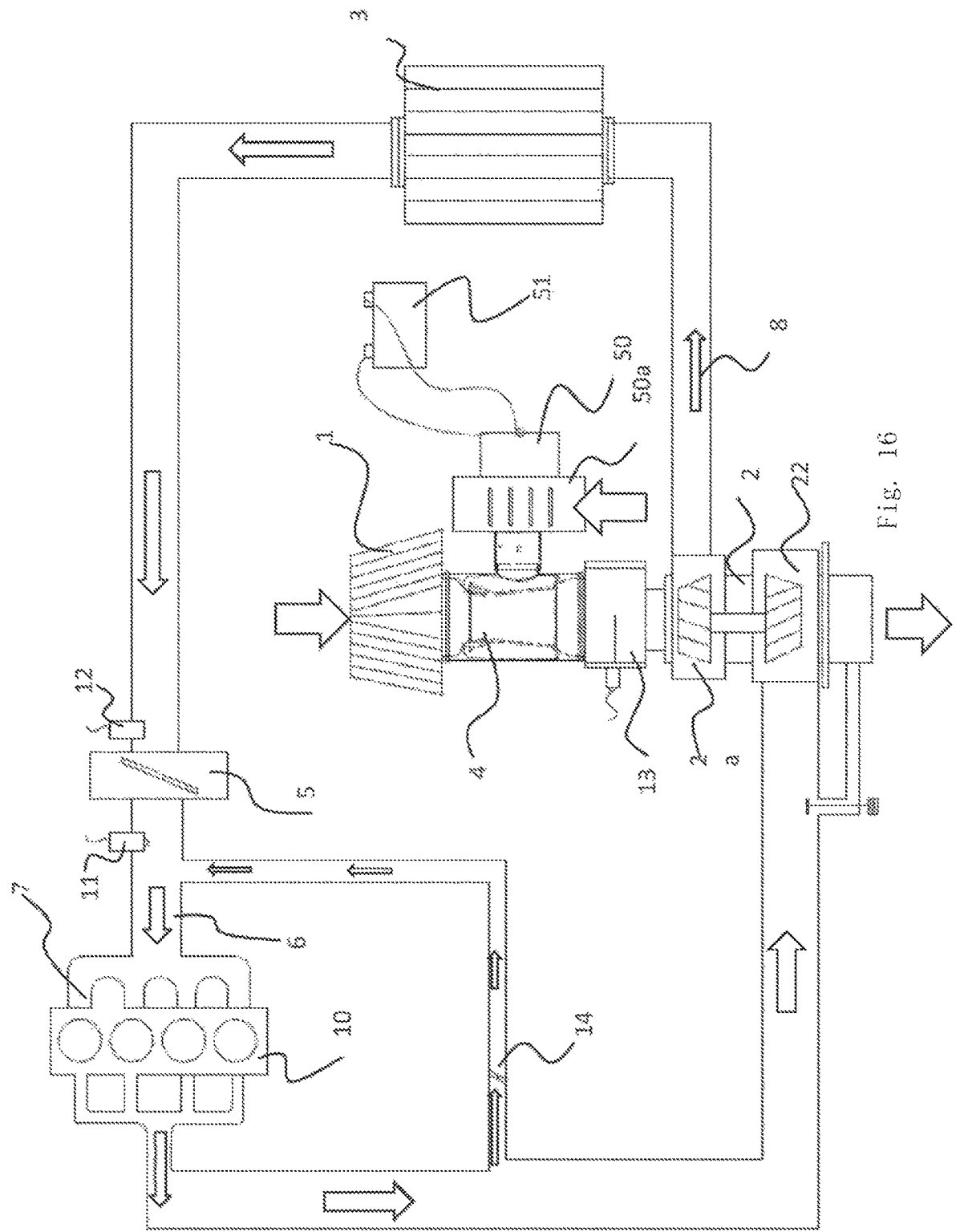
FIG. 16 is a diagram of an intake system of engine with an auxiliary intake assembly according to a third embodiment of the present invention.

FIG. 16 is a diagram of an intake system of engine with an auxiliary intake assembly according to a third embodiment of the present invention. The main difference between present embodiment and the embodiment shown in FIG. 2 is that the position of the auxiliary intake assembly 4, 4' and 4". In the embodiment, the auxiliary intake assembly 4, 4' and 4" are arranged on the intake pipe 8 at upstream of the turbocharger 2, and the rest is the same, which are not described in detail herein.

During operation, fresh air enters the intake pipe 8 through the air filter 1, and then enters the auxiliary air inlet assemblies 4, 4' and 4". Meanwhile, the second fresh air is inhaled by the air inlets 50a of the auxiliary air inlet assemblies 4, 4' and 4". Then, the air pressurized by the auxiliary intake assembly 4 enters the air compressor end 2a of the turbocharger 2. After pressurized by the turbocharger, the high-temperature high-pressure air is cooled through the intercooler 3. Then, the air passes the electronic throttle 5, and then enters the intake manifold main pipe 6 and then enters the cylinder 10. The controller of the auxiliary intake assembly 4, 4' and 4" receives the air inlet pressure, the pressurized air pressure, the engine rotating speed, the position of the electronic throttle and other engine state information, and controls the boost of the auxiliary intake assembly to form a closed-loop control on the target pressure of the boost.

Figure 17:
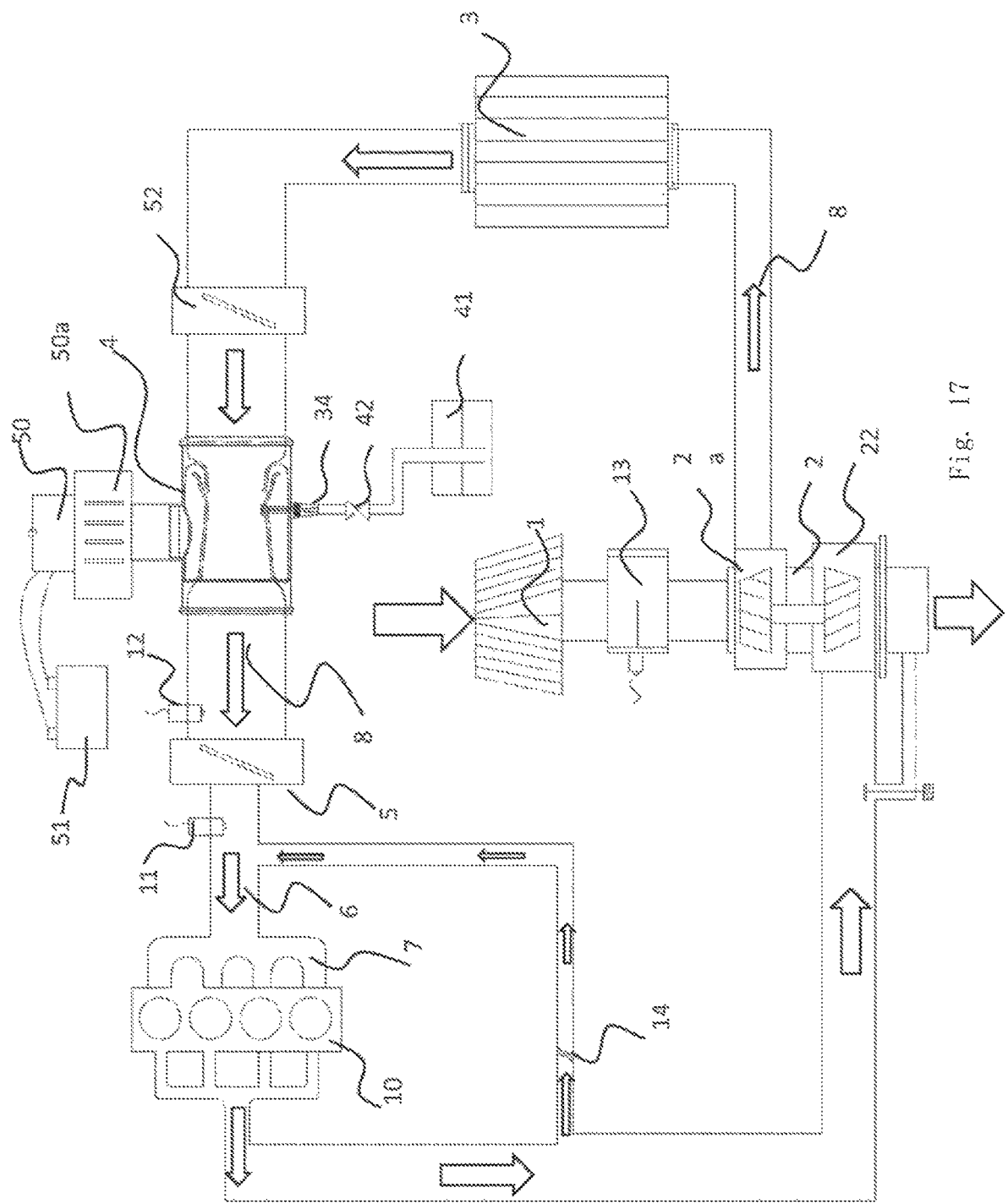
FIG. 17 is a diagram of an intake system of engine with an auxiliary intake assembly, a fluid adding device and a second throttle according to a fourth embodiment of the present invention.

FIG. 17 is an diagram of intake system of engine provided with the auxiliary intake assembly, the liquid adding system and the second throttle according to a fourth embodiment of the present invention. The intake system of engine of present embodiment is formed by combining the intake system of engine shown in FIG. 9 and the auxiliary intake assembly as shown in FIG. 9, which are not described in detail herein. The function of the second throttle is to prevent the air flow entering the main pipe through the auxiliary intake assembly from flowing back to the air inlet end of the upstream turbocharger through adjust the opening degree of the valve of the second throttle, so that the pressurized air provided by the auxiliary intake assembly effectively enters the cylinder, and the effect of rapid boost is achieved.

FIG. 18 is a system diagram of an intake system of engine according to a fifth embodiment of the present invention, wherein the auxiliary intake assembly and the turbocharger share one common air inlet. During operation, fresh air flows through the air filter 1 and the air flow meter 13, enters the intake pipe 8 and then enters the auxiliary intake assembly 4 and the air compressor end 2a of the turbocharger 2. Then, after the air entering the air compressor end 2a of the turbocharger 2 is pressurized by the turbocharger, the high-temperature high-pressure air is cooled through the intercooler 3 and is mixed with the air pressurized by the auxiliary intake assembly 4, 4' and 4". Then, the air passes the electronic throttle 5, and then enters the intake manifold main pipe 6 and then enters the cylinder 10. The controller of the auxiliary intake assembly 4, 4' and 4" receives the air inlet pressure, the pressurized air pressure, the engine rotating speed, the position of the electronic throttle and other engine state information, and controls the boost of the auxiliary intake assembly to form a closed-loop control on the target pressure of the boost.

According to a preferred embodiment, the auxiliary intake assembly is further internally provided with a heating device, wherein the heating device is used for heating air inhaled into the auxiliary intake assembly. Preferably, the heating device is a heating wire or a PTC ceramic material. Preferably, the heating device is electrically connected with the vehicle-mounted battery. Preferably, the heating device is arranged in an air inlet passage of the auxiliary intake assembly. The air inhaled by the air inlet passage is heated through the heating device and enters the air flow pipe.

According to present application, the heating energy and the heating time of the heating device are determined according to the actual working condition of the engine, especially when the engine is in a low-temperature cold starting state. The heating air is inhaled into the cylinder, so that the cold starting emission of the engine can be effectively improved, and the starting time is shortened.

In table 1, the technical effects achieved by arranging the auxiliary intake assembly at different positions are compared, and practicability evaluation is carried out.

TABLE 1

| The position of auxiliary intake assembly arranged | Advantages as compared with a traditional structure | Advantages as compared with other two arranging positions of the invention | Practicability evaluation |
|---|---|---|---|
| Arranged at the pipe between the electronic throttle and the intercooler | 1. The torque is increased by more than 40% by means of extra air inlet amount compensation when the engine runs at 2000 rpm and lower, 2. Emission is reduced, and particularly HC substance emission optimization can be reduced by more than 38% when the temperature is low (<50° C). 3. The cold ignition start is optimized, and success rate of the engine is improved by heating air when the at low-temperature, The starting time is shortened from 13 s to 3 s (−25° C.). 4. fuel consumption | 1. Closer to the air inlet valve of the engine, and the runing distance of the supercharged air before entering the cylinder is shorter, so that the response speed of the engine to the boost control is quicker, and the driving fun is improved. 2. Has the most obvious improvement effect on the cold start of an engine and the heated air directly enters the cylinder through the electronic throttle. 3. The air in the original pipe can be cooled through the additional inhaled air, therefore, the capacity of the engine to suppress the knocking is enhanced, the maximum torque is | High-performance boost solution |

TABLE 1-continued

| | | |
|---|---|---|
| | is reduced by 6-7% (Evaluation Criteria for Comprehensive Fuel Consumption of Vehicles) | increased, and the fuel consumption is acheived. | |
| Arranged at the pipe upstream of the turbocharger | 1. The torque is increased, and the power is increased by 30%-40% by means of additional air flow compensation when the engine runs at 2000 rpm and lower, 2. Emission is reduced, and particularly HC substance emission optimization can be reduced by more than 38% when the temperature is low (<5° C.). 3. The cold ignition start is optimized, and success rate of the engine is improved by heating air when the at low-temperature, The starting time is shortened from 13 s to 3 s (−25° C.) 4. fuel consumption is reduced by 6-7% (Evaluation Criteria for Comprehensive Fuel Consumption of Vehicles) | 1. The arrangement is relatively flexible and simple, and the length of the pipe which can be used to install the auxiliary intake assembly is longer as compared to the solution 1 which is installed on a pipe between the intercooler and the electronic throttle. The installation position is more flexible, which can be integrated on an air inlet resonant cavity or an air filter assembly. 2. The service life design requirement of the annular auxiliary intake assembly is lowered.. Due to the fact that the air inhaled into the electric turbine has an ambient temperature, the working temperature of the pipe gas flowing through the electric turbine is 20-50 DEG lower than that of the solution 1, and the working environment is greatly improved. | Boost solution with cost-effective |
| Arranged at upstream of the electronic throttle | 1. The torque is increased by 30%-40% by means of extra air inlet amount compensation when the engine runs at 2000 rpm and lower. 2. Emission is reduced, and particularly HC substance emission optimization can be reduced by more than 38% when the temperature is low (<5° C.). 3. The cold ignition start is optimized, and success rate of the engine is improved by heating air when the at low-temperature, The starting time is shortened from 13 s to 3 s (−25° C.) 4. Fuel consumption is reduced by 3% (Evaluation Criteria for Comprehensive Fuel Consumption of Vehicles) | 1. The auxiliary intake assembly has a wide working area. The turbocharger of the turbocharging type vehicle starts to run and the electric turbine stop when the engine runs at high-rotation-speed section. As to present structure, due to the fact that no turbocharger is arranged, the electric turbine can carry out boost control over a wider range of engine rotating speed. 2. The working efficiency of the auxiliary intake assembly is higher. Due to there is no the obstruction of the air inlet .passage induced by the air compressor of the turbocharger, the air inlet of the auxiliary intake assembly is smoother, and the required power of the motor can be reduced by 25% under the same boost effect. | Small crowd refitted market with very high performance requirement of motor |

As can be seen from the above table, compared with an existing intake system of engine, whether the engine is a naturally-aspirated engine or a turbocharged engine, the intake system of engine of present invention has obvious improvement on power increasing, emission reduction, the cold start optimization, and the fuel consumption. In addition, different technical effects can be realized by arranging the auxiliary intake assembly at different places.

The intake system of engine of the invention has the following advantages:

1. The original intake system of the engine is slightly changed, and meanwhile, the amount of the air entered is improved efficiently. According to the invention, the supercharged air comes from environment outside the intake pipe, and the air inlet passage of the original pipe is not affected. Therefore, the auxiliary intake assembly will not influence normal air inlet when the auxiliary intake assembly does not work.

2. An independent air inlet is used when the auxiliary intake assembly is used to pressurize. Additional air is inhaled into the auxiliary air inlet passage. An additional air chamber is added and the air is pressurized by it. The pressurized air is guided into the intake pipe through the auxiliary air outlet passage. Meanwhile, the supercharged air drives the air in the intake pipe to accelerate flow when the pressurized air enters the intake pipe. The boost effect of the air flow of the original intake pipe is improved. The air inlet amount is obviously increased, and the boost effect is obvious.

3. The auxiliary air outlet passage adopts an annular gap. Air blown out after boost drives the air in the original intake pipe to move forwards, further achieving the effect of "doubling" the supercharged air. Due to the accelerated flow of the air behind the annular air outlet, the air pressure of the air chamber of the auxiliary intake assembly close to the annular air outlet passage can be reduced, so that more air in the air filter side at the upstream of the auxiliary intake assembly can move towards the air outlet direction so as to balance the air pressure, such that the air inlet amount in the intake pipe is remarkably increased. The flow of the supercharged air flow is stable.

4. The auxiliary air inlet passage is a incision with 0.3-3 mm wide and is positioned in edge of an airflow passage (equivalent to a circular ring amplifier). The air is blown out from the incision. There is no blade cutting the air, so that the supercharged air has no phased impact and fluctuation. Therefore, the air flow is more stable than the air generated by a traditional electric turbine, and turbulence is not easily formed in the intake pipe, and therefore the surge of the engine is not caused.

5. The heating device is additionally arranged in the auxiliary intake assembly, so that the low-temperature air is heated. When the temperature of the outside air is low, the heating device can be used for heating the inhaled air before the is blown out. The low-temperature starting effect of the engine and the stability after running are optimized. Cold starting success rate at low temperature of an engine is improved, and combustion and emission at low temperature of an engine are optimized.

6. Convenient to be mounted, dismounted or cleaned. The auxiliary intake assembly only needs to be connected to an original intake pipe in series without redesigning the size of the original pipe. Meanwhile, jet effect of high velocity airflow at the air outlet enable the fluid communication part of the auxiliary intake assembly is not easy to adsorb dust and oil stains, so that blockage is prevented, and it is free from cleaning and maintenance.

7. Atomized water is guided into the auxiliary intake assembly by arranging a fluid adding device. The air amount entered is increased. The temperature of the cylinder is reduced and thus the knocking is inhibited, the compression ratio is improved, the temperature of exhaust is lowered, and the fuel used to lower the temperature is omitted. Therefore, the purpose of reducing the fuel consumption is achieved. The fuel consumption can be reduced by 15% under a low-speed large-load area with the rotating speed of 2000 revolutions or less.

The preferred embodiments of the present invention have been described in detail above. however, it should be understood that after reading the teachings of the present invention, a person skilled in the field can make various modifications or modifications to the invention. These equivalent forms are also within the scope defined by the appended claims.

The invention claimed is:

1. An intake system of an engine, wherein the intake system comprises an intake pipe, an intake manifold and an intake manifold main pipe, wherein the intake system further comprises an electric supercharger arranged on the intake pipe and located in upstream of the intake manifold main pipe of the engine, wherein the electric supercharger comprises a base, fan blades and a motor arranged in the base as well as a boost pipe in fluid communication with the base, wherein the base is provided with an air inlet, and the boost pipe is provided with an air outlet, wherein the boost pipe is connected in series with the intake pipe and is in fluid communication with the intake pipe, wherein the motor can drive the fan blades to rotate, so that airflow flows into through the air inlet and flows out from the air outlet, and is mixed with air flowing through the intake pipe and then is inhaled into an cylinder of the engine, wherein the center of the boost pipe is provided with a first airflow passage in fluid communication with the intake pipe, and a second airflow passage is formed between an inner pipe wall defining the first airflow passage and the outer pipe wall of the boost pipe, wherein an inlet of the second airflow passage is in fluid communication with the base, and an outlet of the second airflow passage is the air outlet of the boost pipe and is in fluid communication with the first airflow passage, wherein the air outlet of the boost pipe is narrowed relative to the second airflow passage and forms an annular gap, wherein an inlet of the annular gap is in fluid communication with the base through the second airflow passage, an outlet of the annular gap is oriented in the same direction as the flow direction of airflow in the intake pipe, wherein the space formed by the annular gap is in fluid communication with the intake pipe, and wherein an annular guiding plate is arranged at the inlet of the annular gap and used for guiding airflow to flow towards the outlet of the annular gap, wherein the size of the annular gap is 0.3-5 mm, or the size of the annular gap is $1/40$-$1/3$ of the inner diameter of the boost pipe.

2. The intake system of an engine according to claim 1, wherein the second airflow passage is formed by a space between the outer wall of the boost pipe and the inner wall of the boost pipe.

3. The intake system of an engine according to claim 1, wherein the annular gap is formed by combining a section of annular inner wall of the second airflow passage and a section of annular wall extending internally from one end of the boost pipe connected with an air filter.

4. The intake system of engine according to claim 1, wherein the intake system of engine is further provided with a turbocharger and an intercooler, wherein the turbocharger is arranged on the intake pipe between an air filter and the intercooler of the engine, and the electric supercharger is arranged on the intake pipe between the air filter and the turbocharger.

5. The intake system of engine according to claim 1, wherein the intake system of engine is further provided with a turbocharger and an intercooler, wherein the turbocharger is arranged on the intake pipe between an air filter and the intercooler of the engine, and the electric supercharger is arranged on the intake pipe between the intercooler and the intake manifold main pipe.

6. The intake system of engine according to claim 1, wherein the electric supercharger is arranged on the intake pipe between an air filter of an engine and an intake manifold main pipe.

7. An intake system of an engine, wherein the intake system comprises an intake pipe, an intake manifold and an intake manifold main pipe, wherein the intake system further comprises an electric supercharger arranged on the intake pipe and located in upstream of the intake manifold main pipe of the engine, wherein the electric supercharger comprises a base, fan blades and a motor arranged in the base as well as a boost pipe in fluid communication with the base, wherein the base is provided with an air inlet, and the boost pipe is provided with an air outlet, wherein the boost pipe is connected in series with the intake pipe and is in fluid communication with the intake pipe, wherein the motor can drive the fan blades to rotate, so that airflow flows into through the air inlet and flows out from the air outlet, and is mixed with air flowing through the intake pipe and then is inhaled into an cylinder of the engine, wherein the center of the boost pipe is provided with a first airflow passage in fluid communication with the intake pipe, and a second airflow passage is formed between an inner pipe wall defining the first airflow passage and the outer pipe wall of the boost pipe, wherein an inlet of the second airflow passage is in fluid communication with the base, and an outlet of the second airflow passage is the air outlet of the boost pipe and is in fluid communication with the first airflow passage, wherein the air outlet of the boost pipe is narrowed relative to the second airflow passage and forms an annular gap, wherein an inlet of the annular gap is in fluid communication with the base through the second airflow passage, an outlet of the annular gap is oriented in the same direction as the flow direction of airflow in the intake pipe, wherein the space formed by the annular gap is in fluid communication with the intake pipe, and wherein an annular guiding plate is arranged at the inlet of the annular gap and used for guiding airflow to flow towards the outlet of the annular gap, wherein a heating device is internally arranged in the electric supercharger, wherein the heating device is used for heating air inhaled into the electric supercharger.

8. The intake system of an engine according to claim 7, wherein the heating device is installed in the base and is located at front of the fan of the electric supercharger, or the heating device is arranged in the base and is located at the air inlet.

* * * * *